US012721447B2

(12) United States Patent
Drake

(10) Patent No.: US 12,721,447 B2
(45) Date of Patent: Sep. 1, 2026

(54) PORTABLE AND COLLAPSIBLE SADDLE SLEEPER

(71) Applicant: Dragovich Creations, LLC, Arvada, CO (US)

(72) Inventor: Bradley D Drake, Golden, CO (US)

(73) Assignee: Dragovich Creations, LLC, Arvada, CO (US)

( * ) Notice: Subject to any disclaimer, the term of this patent is extended or adjusted under 35 U.S.C. 154(b) by 0 days.

(21) Appl. No.: 19/221,355

(22) Filed: May 28, 2025

(65) Prior Publication Data

US 2025/0288118 A1 Sep. 18, 2025

Related U.S. Application Data

(63) Continuation-in-part of application No. 18/903,282, filed on Oct. 1, 2024, which is a continuation of application No. PCT/US2023/015630, filed on Mar. 20, 2023.

(60) Provisional application No. 63/326,732, filed on Apr. 1, 2022.

(51) Int. Cl.

| | |
|---|---|
| ***A47C 20/04*** | (2006.01) |
| ***A47C 17/64*** | (2006.01) |
| ***A47C 17/70*** | (2006.01) |
| ***A47C 20/08*** | (2006.01) |
| ***A61G 7/015*** | (2006.01) |
| ***A61G 7/07*** | (2006.01) |

(52) U.S. Cl.

CPC .............. *A47C 20/04* (2013.01); *A47C 17/70* (2013.01); *A61G 7/015* (2013.01); *A61G 7/07* (2013.01); *A47C 17/64* (2013.01); *A47C 20/08* (2013.01)

(58) Field of Classification Search

CPC ....... A47C 20/04; A47C 20/08; A47C 20/043; A47C 20/047; A47C 20/027; A47C 17/64; A47C 17/645; A47C 17/66; A47C 17/70; A47C 17/82; A61G 7/015; A61G 7/002; A61G 7/07; A61G 7/065

USPC ... 5/722, 657, 652, 632, 633, 655, 111, 110, 5/114, 112

See application file for complete search history.

(56) References Cited

U.S. PATENT DOCUMENTS 3,947,903 A * 4/1976 Menke .................. A47C 17/70 5/112
7,103,927 B2 * 9/2006 Holub .................... A47C 17/70 5/112
11,707,134 B2 * 7/2023 Lee ........................ A47C 7/006 297/16.1
D1,081,176 S * 7/2025 Drake ............................ D6/382

(Continued)

FOREIGN PATENT DOCUMENTS

WO WO-2023204917 A1 * 10/2023 ............. A47C 20/04

*Primary Examiner* — Robert G Santos

(74) *Attorney, Agent, or Firm* — BrainSpark Associates, LLC

(57) ABSTRACT

The collapsible saddle sleeper allows a person (e.g., adults or children) to collapse and transport the sleeper to any desired location to allow sleep in an angled position on their stomach (e.g., upper torso) and head in a straddle, sitting-like position, which helps reduce a variety of symptoms that are tied to specific medical conditions. In one example, the angled position may help a person to reduce and/or eliminate congestion and/or coughing while attempting to sleep when it's due to a common cold, flu or disease.

19 Claims, 24 Drawing Sheets

(56) References Cited

U.S. PATENT DOCUMENTS

| | | | | |
|---|---|---|---|---|
| 2006/0059620 A1* | 3/2006 | Holub | .................... | A47C 17/70<br>5/114 |
| 2022/0175140 A1* | 6/2022 | Lee | ........................ | A47C 7/628 |
| 2025/0017386 A1* | 1/2025 | Drake | ...................... | A61G 7/07 |
| 2025/0288118 A1* | 9/2025 | Drake | .................... | A47C 20/04 |

* cited by examiner

PORTABLE AND COLLAPSIBLE SADDLE SLEEPER

CROSS-REFERENCE TO RELATED APPLICATIONS

This application is a continuation-in-part application of continuation application, application Ser. No. 18/903,282, filed on Oct. 1, 2024 entitled "Saddle Sleeper," which is a continuation from PCT International Application No. PCT/US2023/015630 filed on Mar. 20, 2023, entitled "Saddle Sleeper," which claims the benefit of U.S. Provisional Application No. 63/326,732 entitled "Incline Sleeper" filed Apr. 1, 2022, the disclosures of which are incorporated by reference herein in their entireties.

TECHNICAL FIELD

The disclosure relates to a collapsible bed, sleeper or cradle that includes angles of inclination to allow a person to be supported comfortably during use. More specifically, the disclosure relates to a collapsible sleeper or bed that includes angles of inclination to allow a person to sleep in straddled, forward facing position to reduce symptoms due to a variety of medical conditions.

BACKGROUND OF THE INVENTION

It can be difficult for children with the flu, asthma, upper respiratory infections, and allergies to fall asleep and stay asleep at night due to constant coughing, hacking, and wheezing. This can result in excess drainage and mucus, which can contaminate pillows, blankets and sheets, as well as create sore throats that make it difficult to eat or swallow during the waking hours. Unfortunately, parents can also lose sleep from the constant noise and the overall concern for their children's health.

Currently, there are various inclined beds on the market, but these apparatuses require children to lie on their back or side, allowing congestion to build, and can subject children to falling from or sliding off of the incline to the bottom, possibly becoming pinned during the night. The current inclined beds contain sleeping surfaces that require a user to sleep on his or her back and do not enable a user to sleep in a face down position in a manner recommended for optimal drainage.

BRIEF SUMMARY OF INVENTION

Figure 1A:
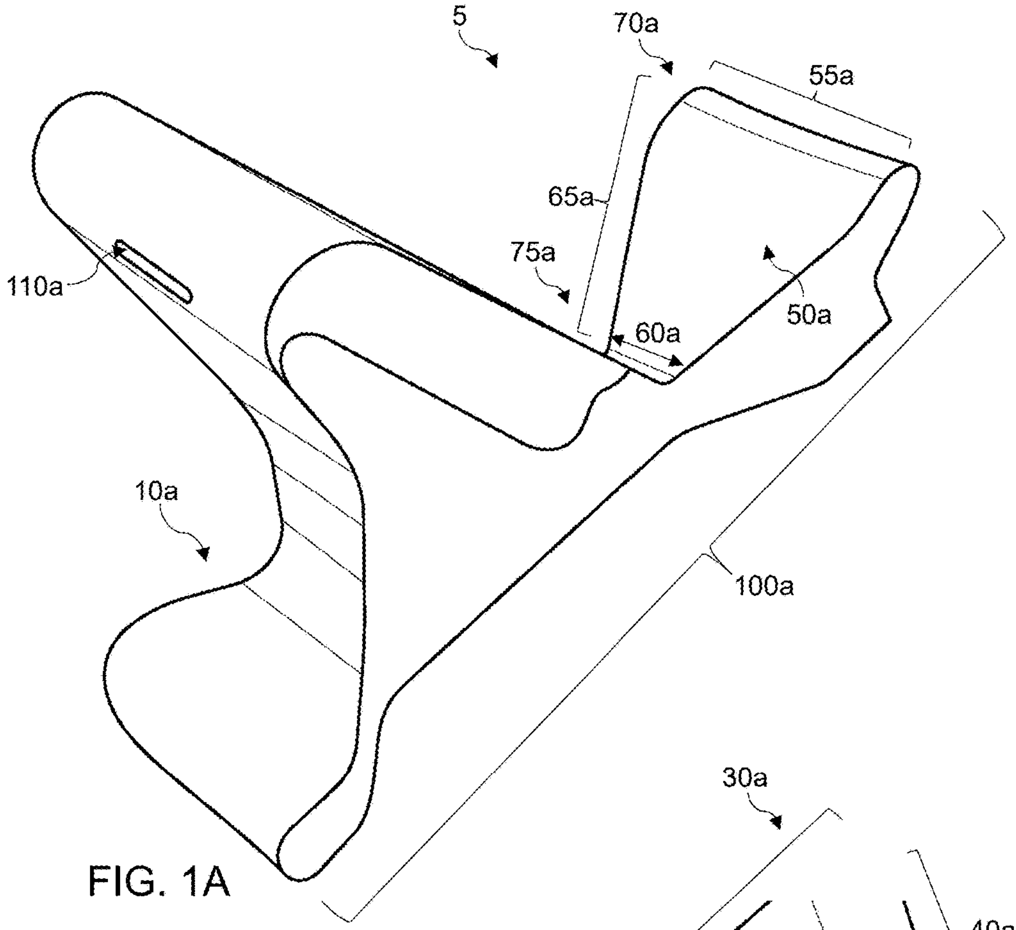
FIGS. 1A-1C display multiple views of a first embodiment of a saddle sleeper without padding.
Figure 1B:
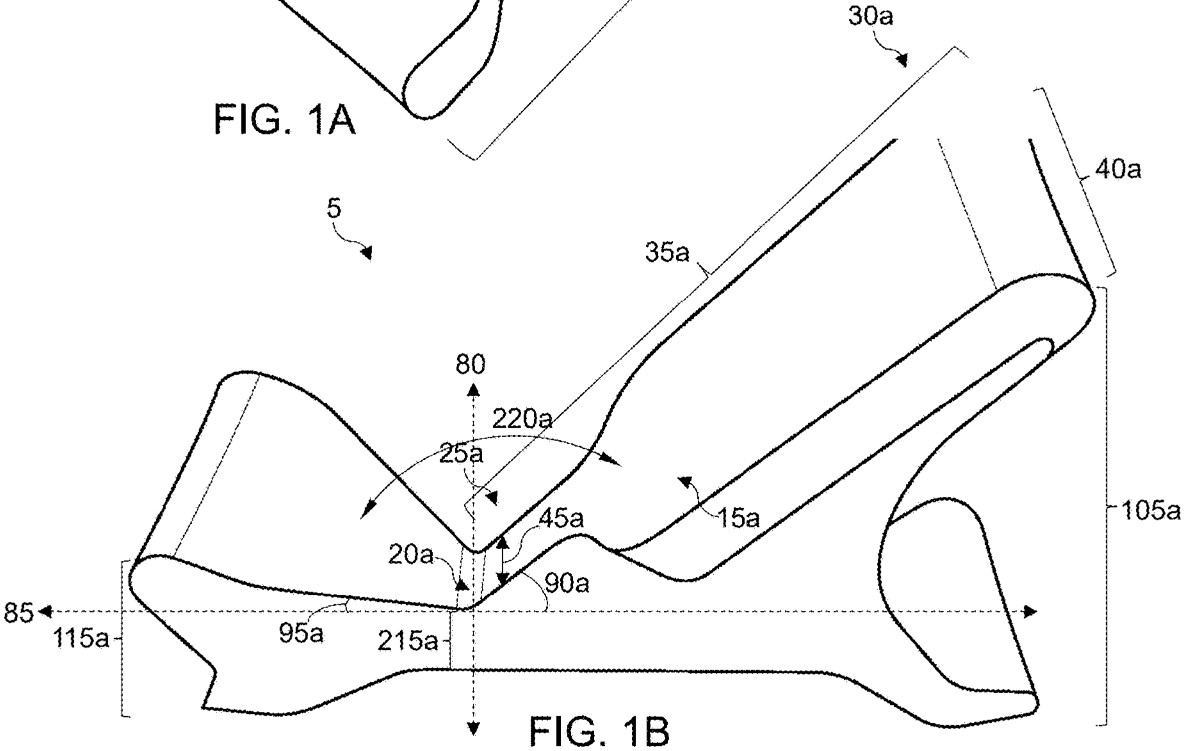
Figure 1C:
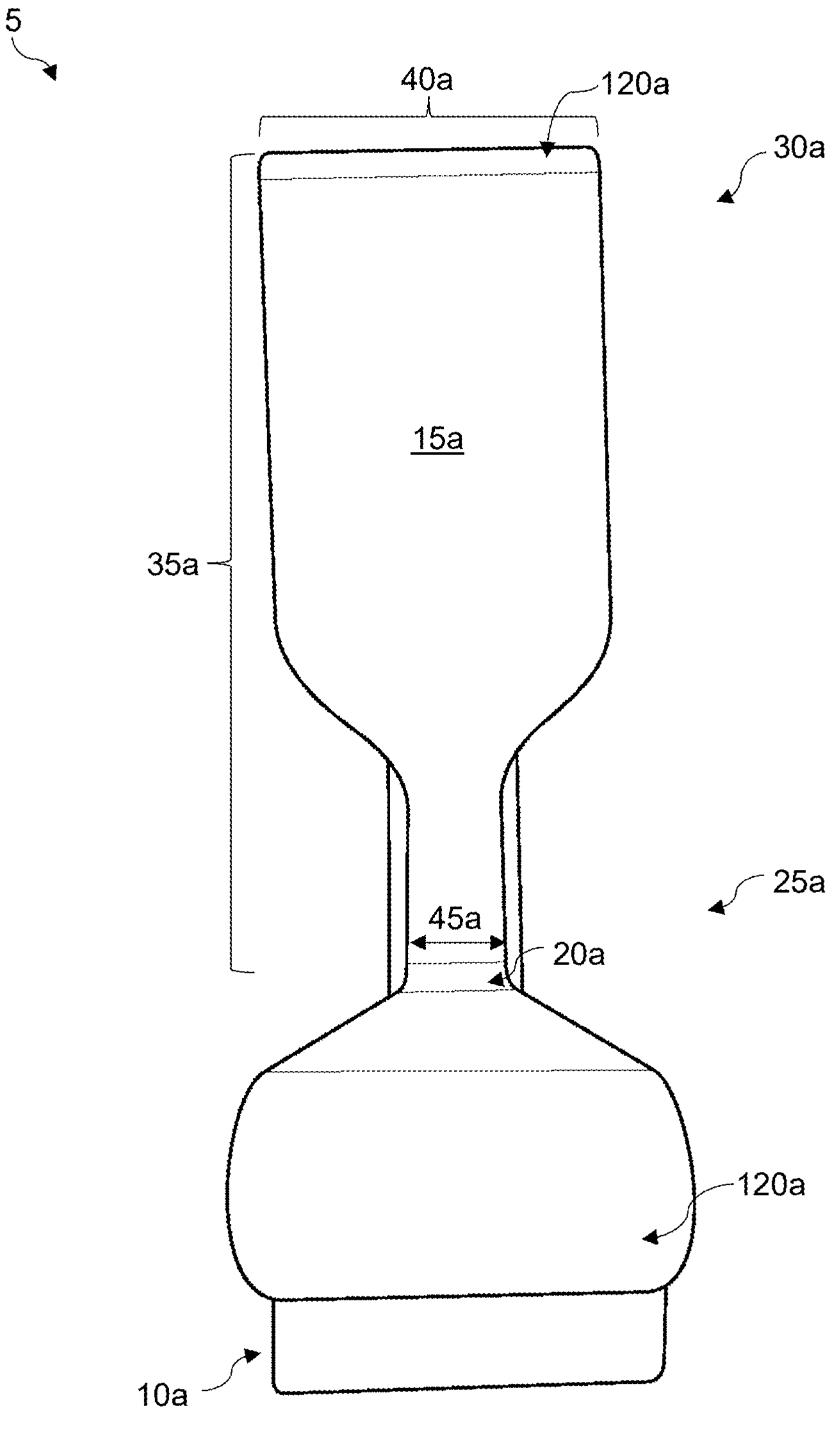

In one embodiment, the sleeper comprising: a first surface, the first surface comprises a first top width, a first bottom width, a first surface shape and a first surface angle, the first bottom width is smaller than the first top width, the first surface is configured to support at least a portion of a ventral side of an upper torso of a person; a second surface, the second surface comprises a second top width, a second bottom width, a second surface shape and a second surface angle, the second bottom width is smaller than the second top width, the second surface is configured to support at least a portion of a dorsal side of a buttocks of a person; the first surface and the second surface intersect at an intersection region at a surface orientation angle, the intersection region includes an intersection height and an intersection width; and a base, the base supporting the first surface and the second surface.

In another embodiment, the sleeper comprising: a first surface, the first surface comprises a first surface width, a first surface shape and a first surface angle, the first surface is configured to support at least a portion of a ventral side of an upper torso of a person; a second surface, the second surface comprises a second surface width, a second surface shape and a second surface angle, the second surface is configured to support least a portion of a buttocks of a person; the first surface and the second surface intersect at a surface orientation angle at an intersection region, the intersection region includes an intersection width, intersection height, the intersection width comprises a smaller width than the first surface width and a second surface width; and a base, the base supporting the first surface and the second surface.

In another embodiment, the adjustable sleeper comprising: a first surface, a second surface, a base and a locking mechanism; the first surface comprises a first surface width, a first surface shape and a first surface angle, the first surface is configured to support at least a portion of a ventral side of an upper torso of a person; the second surface comprises a second surface width, a second surface shape and a second surface angle, the second surface is configured to support least a portion of a buttocks of a person; the first surface and the second surface intersect at one or more surface orientation angles at an intersection region, the intersection region includes an intersection width, intersection height, the intersection width comprises a smaller width than the first surface width and a second surface width; the base comprising a first portion, a second portion and one or more base orientation angles, the first portion of the base supporting the first surface and the second portion of the base supporting the second surface, the first portion of the base moves relative to the second portion of the base while changing the base orientation angle and the surface orientation angle of the first surface and second surface; the locking mechanism engaging with the base, first surface and/or second surface to secure or set the desired one or more base orientation angle or the one or more surface orientation angle. The adjustable sleeper is movable from a first position, an unlocked, folded configuration, to a second position, a locked, unfolded or open configuration.

DETAILED DESCRIPTION OF INVENTION

There exists a need for an improved saddle or straddle sleeper 5, 135, 155, 165, 235, 300, 365, 490 that enables a person to sleep on the saddle sleeper to eliminate or reduce one or more symptoms while they are sleeping. The saddle or straddle sleeper 5, 135, 155, 165, 235, 300, 365, 490 is designed to enable a person to sleep on their stomachs or upper torso in an angled orientation while still enabling them to touch the ground to aid in stability (see FIGS. 2A-2B). The angled orientation of the sleeper 5, 135, 155, 165, 235, 300, 365, 490 allows a person to take advantage of gravity to simulate or substantially simulate the natural drainage and blood flow of the body while a person is sitting upright. The angled orientation also helps reduce or eliminate coughing and/or congestion while trying to sleep.

Accordingly, the sleeper 5, 135, 155, 165, 235, 300, 365, 490 can also be used for a variety of other medical applications or medical conditions that require the improvement of symptoms while at an angled orientation, including persons who may have cystic fibrosis, acid reflux, night-time cough, sleep apnea, sinus congestion, other pulmonary conditions, ear infections, glaucoma, ocular hypertension, cold, flu, allergies and/or any combination thereof. The first and second surface angles or angled orientations may match or substantially match the angle needed for proper postural drainage therapy (15 to 45 degrees) and/or the reduction or elimination of symptoms of any relevant medical conditions. The sleeper 5, 135, 155, 165, 235, 300, 365, 490 further comprises different sizes. The sizes may include general sizing such as small, medium, large or x-large. Also, the size may include custom sized sleepers 5, 135, 155, 165, 235, 300, 365, 490 for any person, the persons include adults and children.

The sleeper 5, 135, 155, 165, 235, 300, 365, 490 comprises a first angled surface that can be sized and configured to support different persons torsos, including adults, children and/or toddlers. The sleeper 5, 135, 155, 165, 235, 300, 365, 490 can sit on a floor for easy access and safety. It may also be positioned next to a bed if desired to add further stability and support. The sleeper 5, 135, 155, 165, 235, 300, 365, 490 can include a second angled seat or surface that supports the buttocks of different persons.

In one embodiment, the sleeper 5, 135, 155, 165, 135, 155, 165, 235, comprises a first surface 15*a*, 15*b*, 15*c*, 15*d*, 15*e*, a second surface 50*a*, 50*b*, 50*c*, 50*d*, 50*e* and a base 10*a*, 10*b*, 10*c*, 10*d*, 10*e*; the base 10*a*, 10*b*, 10*c*, 10*d*, 10*e* supports the first surface 15*a*, 15*b*, 15*c*, 15*d*, 15*e* and the second surface 50*a*, 50*b*, 50*c*, 50*d*, 50*e*. The first surface 15*a*, 15*b*, 15*c*, 15*d*, 15*e* comprises a first top width 40*a*, 40*b*, 40*c*, 40*d*, 40*e*, a first bottom width 45*a*, 45*b*, 45*c*, 45*d*, 45*e*, a first surface shape and a first angle 95*a*, 95*b*, 95*c*, 95*d*, 95*e*, the first bottom width 45*a*, 45*b*, 45*c*, 45*d*, 45*e* is smaller than the first top width 40*a*, 40*b*, 40*c*, 40*d*, 40*e*, the first surface 15*a*, 15*b*, 15*c*, 15*d*, 15*e* is configured to contact or support at least a portion of a frontal plane or anterior facing anatomical regions of an upper torso of a person; the second surface 50*a*, 50*b*, 50*c*, 50*d*, 50*e* comprises a second top width 55*a*, 55*b*, 55*c*, 55*d*, 55*e*, a second bottom width 60*a*, 60*b*, 60*c*, 60*d*, a second surface shape and a second angle 90*a*, 90*b*, 90*c*, 90*d*, 90*e*, the second bottom width 60*a*, 60*b*, 60*c*, 60*d*, 60*e* is smaller than the second top width 55*a*, 55*b*, 55*c*, 55*d*, 55*e* the second surface 50*a*, 50*b*, 50*c*, 50*d*, 50*e* is configured to contact or support at least a portion of a buttocks of a person or configured to support at least a portion of posterior facing anatomical regions of a person's lower torso; the first surface 15*a*, 15*b*, 15*c*, 15*d*, 15*e* and the second surface 50*a*, 50*b*, 50*c*, 50*d*, 50*e* intersect at an orientation angle 220*a*, 220*b*, 220*c*, 220*d*, 220*e* at an intersection region 20*a*, 20*b*, 20*c*, 20*d*, 20*e*, the intersection region 20*a*, 20*b*, 20*c*, 20*d*, 20*e* includes an intersection height 215*a*, 215*b*,215*c*, 215*d*, 215*e* and an intersection shape.

In another embodiment, the sleeper comprises: the sleeper 5, 135, 155, 165, 235, comprises a first surface 15*a*, 15*b*, 15*c*, 15*d*, 15*e*, a second surface 50*a*, 50*b*, 50*c*, 50*d*, 50*e* and a base 10*a*, 10*b*, 10*c*, 10*d*, 10*e*. The first surface 15*a*, 15*b*, 15*c*, 15*d*, 15*e* comprises a first surface width 40*a*, 40*b*, 40*c*, 40*d*, 40*e*, a first surface shape and a first surface angle 95*a*, 95*b*, 95*c*, 95*d*, 95*e*, the first surface 15*a*, 15*b*, 15*c*, 15*d*, 15*e* is configured to contact at least a portion of a frontal plane or anterior facing anatomical regions of an upper torso of a person; the second surface 50*a*, 50*b*, 50*c*, 50*d*, 50*e* comprises a second surface width 45*a*, 45*b*, 45*c*, 45*d*, 45*e*, a second surface shape and a second surface angle, the second surface 50*a*, 50*b*, 50*c*, 50*d*, 50*e* is configured to contact at least a portion of a buttocks of a person or configured to support at least a portion of posterior facing anatomical regions of a person's lower torso; the first surface 15*a*, 15*b*, 15*c*, 15*d*, 15*e* and the second surface 50*a*, 50*b*, 50*c*, 50*d*, 50*e* intersect at a non-parallel angle 220*a*, 220*b*, 220*c*, 220*d*, 220*e*, at an intersection region, the intersection region 20*a*, 20*b*, 20*c*, 20*d*, 20*e* includes an intersection width, intersection height 215*a*, 215*b*, 215*c*, 215*d*, 215*e* and an intersection shape, the intersection width comprises a smaller width than the first surface width 40*a*, 40*b*, 40*c*, 40*d*, 40*e* and a second surface width 45*a*, 45*b*, 45*c*, 45*d*, 45*e*; and the base 10*a*, 10*b*, 10*c*, 10*d*, 10*e* is supporting the first surface 15*a*, 15*b*, 15*c*, 15*d*, 15*e* and the second surface 50*a*, 50*b*, 50*c*, 50*d*, 50*e*.

Referring to FIGS. 1A-1C, 2A-2B, 3A-3D, 4A-4H, 5D-5F, 7A-7E, 8, and 9A-9B, the sleeper 5, 135, 155, 165, 235, comprises a first surface 15*a*, 15*b*, 15*c*, 15*d*, 15*e* a second surface 50*a*, 50*b*, 50*c*, 50*d*, 50*e* and a base 10*a*, 10*b*, 10*c*, 10*d*, 10*e*. The base 10*a*, 10*b*, 10*c*, 10*d*, 10*e* supports the first surface 15*a*, 15*b*, 15*c*, 15*d*, 15*e* and the second surface 50*a*, 50*b*, 50*c*, 50*de*. The base 10*a*, 10*b*, 10*c*, 10*d*, 10*e* comprises a base width 100*a*, 100*b*, 100*c*, 100*d*, 100*e*. The first surface 15*a*, 15*b*, 15*c*, 15*d*, 15*e* comprises a first top end 30*a*,30*b*,30*c*,30*d*, a first bottom end 25*a*, 25*b*, 25*c*, 25*e*, a first surface shape, a first top width 40*a*, 40*a*, 40*c*, 40*d*, 40*e*, a first bottom width 45*a*, 45*b*, 45*c*, 45*d*, 45*e*, a first surface height 105*a*, 105*b*, 105*c*, 105*d*, 105*e* a first surface length 35*a*, 35*b*, 35*c*, 35*d*, 35*e* and/or a first surface angle 95*a*, 95*b*, 95*c*, 95*d*, 95*e*.

The first top width 40*a*, 40*b*, 40*c*, 40*d*, 40*e* is at or adjacent to the first top end 30*a*,30*b*,30*c*,30*d*. The first top width 40*a*, 40*b*, 40*c*, 40*d*, 40*e* comprises a width of at least 15 inches or greater; comprises a width of 17 inches or greater; comprises a width of 15 inches to 20 inches; and/or comprises a width of 16 to 18 inches. The first bottom width 45*a*, 45*b*, 45*c*, 45*d*, 45*e* is at or adjacent to the first bottom end 25*a*, 25*b*, 25*c*, 25*e*. The first bottom width 45*a*, 45*b*, 45*c*,

45*d*, 45*e* comprises a width of at least 5 inches or greater; comprises a width of at least 6 inches or greater; comprises a width of 4 to 10 inches; comprises a width of 5 to 8 inches; and/or comprises a width of 6 to 8 inches. Accordingly, the first top width 40*a*, 40*b*, 40*c*, 40*d*, 40*e* is greater than the first bottom width 45*a*, 45*b*, 45*c*, 45*d*, 45*e*. The first bottom width 45*a*, 45*b*, 45*c*, 45*d*, 45*e* comprises a smaller width than the first top width 40*a*, 40*b*, 40*c*, 40*d*, 40*e*.

The first surface 15*a*, 15*b*, 15*c*, 15*d*, 15*e* comprises a first surface angle 95*a*, 95*b*, 95*c*, 95*d*, 95*e*. The first surface angle 95*a*, 95*b*, 95*c*, 95*d*, 95*e* is positioned relative to the floor and/or the longitudinal axis 85. The first surface angle 95*a*, 95*b*, 95*c*, 95*d*, 95*e* comprises an angle of at least 20 degrees or greater; comprises an angle of at least 25 degrees or greater; comprises an angle of 30 degrees or greater; comprises an angle of 35 degrees or greater; comprises an angle of 40 degrees or greater; comprises an angle of 20 degrees to 50 degrees; comprises an angle of 30 degrees to 50 degrees; and/or comprises an angle of 35 degrees to 45 degrees.

The first surface 15*a*, 15*b*, 15*c*, 15*d*, 15*e* comprises a first surface height 105*a*, 105*b*, 105*c*, 105*d*, 105*e*. The first surface height 105*a*, 105*b*, 105*c*, 105*d*, 105*e* comprises a height of at least 15 inches or greater; the first surface height 105*a*, 105*b*, 105*c*, 105*d*, 105*e* comprises of at least 20 inches or greater; the height comprises at least 23 inches or greater; the height comprises 15 inches to 25 inches; the height comprises at least 20 inches to 25 inches; and/or the height comprises 22 inches to 24 inches. The first surface height 105*a*, 105*b*, 105*c*, 105*d*, 105*e* may be at or adjacent to the first top end 30*a*, 30*b*, 30*c*, 30*d*, 30*e* of the first surface 15*a*, 15*b*, 15*c*, 15*d*, 15*e*.

The first surface 15*a*, 15*b*, 15*c*, 15*d*, 15*e* comprises a first surface length 35*a*, 35*b*, 35*c*, 35*d*, 35*e*. The first surface length 35*a*, 35*b*, 35*c*, 35*d*, 35*e* comprises a length of at least 15 inches or greater; comprises a length of at least 20 inches or greater; comprises a length of at least 25 inches or greater; comprises a length of at least 28 inches or greater; comprises a length of 20 inches to 30 inches; comprises a length of 25 inches to 30 inches; and/or comprises a length of 27 inches to 29 inches.

The first surface 15*a*, 15*b*, 15*c*, 15*d*, 15*e* comprises a first surface shape. The first surface shape may include a profile shape, the profile shape comprises a flat, curved or concave surface. The curved or concave shaped surface may be sized and configured to accommodate a person's torso, e.g., an adult or a child. The first surface shape may further include an oval, circular, and/or any polygonal shape. The polygonal shape includes a triangle, a square, a rectangle, a heptagon, a hexagon, and/or any combination thereof. The first surface shapes may further include rounded polygonal shapes, such as a rounded-triangle, a rounded-square, a rounded rectangular, a rounded-heptagon, a rounded-hexagon, and/or any combination thereof.

Also, referring to FIGS. 1A-1C, 2A-2B, 3A-3D, 4A-4H, 5D-5F, 7A-7E, 8, and 9A-9B, the sleeper 5, 135, 155, 165, 235 comprises a second surface 50*a*, 50*b*, 50*c*, 50*d*, 50*e*. The second surface 50*a*, 50*b*, 50*c*, 50*d*, 50*e* comprises a second top end 70*a*, 70*b*, 70*c*, 70*d*, 70*e* a second bottom end 75*a*, 75*b*, 75*c*, 75*d*, 75*e* a second surface shape, a second top width 55*a*, 55*b*, 55*c*, 55*d*, 55*e* a second bottom width 60*a*, 60*b*, 60*c*, 60*d*, 60*e* a second surface height 115*a*, 115*b*, 115*c*, 115*d*, 115*e* and/or a second surface angle 90*a*, 90*b*, 90*c*, 90*d*, 90*e*.

The second top width 55*a*, 55*b*, 55*c*, 55*d*, 55*e* is at or adjacent to the second top end 70*a*, 70*b*, 70*c*, 70*d*, 70*e*. The second top width 55*a*, 55*b*, 55*c*, 55*d*, 55*e* comprises a width of at least 5 inches or greater; comprises a width of 10 inches or greater; comprises a width of 5 inches to 15 inches; and/or comprises a width of 8 to 11 inches. The second bottom width 60*a*, 60*b*, 60*c*, 60*d*, 60*e* is at or adjacent to the second bottom end 75*a*, 75*b*, 75*c*, 75*d*, 75*e*. The second bottom width 60*a*, 60*b*, 60*c*, 60*d*, 60*e* comprises a width of at least 2 inches or greater; comprises a width of at least 4 inches or greater; comprises a width of 2 to 6 inches; comprises a width of 3 to 6 inches; and/or comprises a width of 4 to 5 inches. Accordingly, the second top width 55*a*, 55*b*, 55*c*, 55*d*, 55*e* is greater than the second bottom width 60*a*, 60*b*, 60*c*, 60*d*, 60*e*. The second bottom width 60*a*, 60*b*, 60*c*, 60*d*, 60*e* comprises a smaller width than the second top width 55*a*, 55*b*, 55*c*, 55*d*, 55*e*.

The second surface 50*a*, 50*b*, 50*c*, 50*d*, 50*e* comprises a second surface angle 90*a*, 90*b*, 90*c*, 90*d*, 90*e*. The second surface angle 90*a*, 90*b*, 90*c*, 90*d*, 90*e* is positioned relative to the floor and/or the longitudinal axis 85. The second surface angle 90*a*, 90*b*, 90*c*, 90*d*, 90*e* comprises an angle of at least 20 degrees or greater; comprises an angle of at least 25 degrees or greater; comprises an angle of 30 degrees or greater; comprises an angle of 35 degrees or greater; comprises an angle of 40 degrees or greater; comprises an angle of 20 degrees to 50 degrees; comprises an angle of 30 degrees to 50 degrees; and/or comprises an angle of 35 degrees to 45 degrees.

The second surface 50*a*, 50*b*, 50*c*, 50*d*, 50*e* comprises a second surface height 115*a*, 115*b*, 115*c*, 115*d*, 115*e*. The second surface height 115*a*, 115*b*, 115*c*, 115*d*, 115*e* comprises a height of at least 15 inches or greater; the first surface height 105*a*, 105*b*, 105*c*, 105*d*, 105*e* comprises of at least 10 inches or greater; the height comprises at least 13 inches or greater; the height comprises a 10 inches to 15 inches; the height comprises at least 10 inches to 14 inches; and/or the height comprises 12 inches to 14 inches. The second surface height 115*a*, 115*b*, 115*c*, 115*d*, 115*e* may be at or adjacent to the second top end 70*a*, 70*b*, 70*c*, 70*d*, 70*e* of the second surface 50*a*, 50*b*, 50*c*, 50*d*, 50*e*.

The second surface 50*a*, 50*b*, 50*c*, 50*d*, 50*e* comprises a second surface length 65*a*, 65*b*, 65*c*, 65*d*, 65*e*. The second surface length 65*a*, 65*b*, 65*c*, 65*d* comprises a length of at least 5 inches or greater; comprises a length of at least 7 inches or greater; comprises a length of at least 10 inches or greater; comprises a length of 5 inches to 15 inches; comprises a length of 7 inches to 13 inches; and/or comprises a length of 10 inches to 12 inches.

The second surface 50*a*, 50*b*, 50*c*, 50*d*, 50*e* comprises a second surface shape. The second surface shape may include a flat, curved or concave surface. The curved or concave shaped surface may be sized and configured to accommodate a person's torso, e.g., an adult or a child. The first surface shape may further include oval, circular, and/or any polygonal shape. The polygonal shape includes a triangle, a square, a rectangle, a heptagon, a hexagon, and/or any combination thereof. The second surface shapes may further include rounded polygonal shapes, such as a rounded-triangle, a rounded-square, a rounded rectangular, a rounded-heptagon, a rounded-hexagon, and/or any combination thereof.

In one embodiment, the first surface angle 95*a*, 95*b*, 95*c*, 95*d*, 95*e* may comprise a same angle than the second surface angle 90*a*, 90*b*, 90*c*, 90*d*, 90*e*. The first surface angle 95*a*, 95*b*, 95*c*, 95*d*, 95*e* may comprise a different angle than the second surface angle 90*a*, 90*b*, 90*c*, 90*d*, 90*e*. The first surface height 105*a*, 105*b*, 105*c*, 105*d*, 105*e* may comprise a same height than the second surface height 115*a*, 115*b*, 115*c*, 115*d*, 115*e*. The first surface height 105*a*, 105*b*, 105*c*,

105*d*, 105*e* may comprise a different height than the second surface height 115*a*, 115*b*, 115*c*, 115*e*, 115*e*. The first top width 40*a*, 40*b*, 40*c*, 40*d*, 40*e* may comprise a same width than the second top width 55*a*, 55*b*, 55*c*, 55*d*, 55*e*. The first top width 40*a*, 40*b*, 40*c*, 40*d*, 40*e* may comprise a different width than the second top width 55*a*, 55*b*, 55*c*, 55*d*, 55*e*. The first bottom width 45*a*, 45*b*, 45*c*, 45*d*, 45*e* may comprise a same width as the second bottom width 60*a*, 60*b*, 60*c*, 60*d*, 60*e*. The first bottom width 45*a*, 45*b*, 45*c*, 45*d*, 45*e* may comprise a different width as the second bottom width 60*a*, 60*b*, 60*c*, 60*d*, 60*e*. The first surface shape may comprise a same shape as the second surface shape. The first surface shape may comprise a different shape as the second surface shape. The first surface length 35*a*, 35*b*, 35*c*, 35*d*, 35*e* may comprise a same length as the second surface length 65*a*, 65*b*, 65*c*, 65*d*, 65*e*. The first surface length 35*a*, 35*b*, 35*c*, 35*d*, 35*e* may comprise a different length as the second surface length 65*a*, 65*b*, 65*c*, 65*d*, 65*e*.

In another embodiment, the first surface 15*a*, 15*b*, 15*c*, 15*d*, 15*e* is in a surface orientation angle 220*a*, 220*b*, 220*c*, 220*d*, 220*e* relative to the second surface 50*a*, 50*b*, 50*c*, 50*d*, 50*e*. The surface orientation angle 220*a*, 220*b*, 220*c*, 220*d*, 220*e* comprises an obtuse angle. The surface orientation angle 220*a*, 220*b*, 220*c*, 220*d*, 220*e* comprises an angle of 90 degrees or greater; the surface orientation angle 220*a*, 220*b*, 220*c*, 220*d*, 220*e* comprises an angle of 100 degrees or greater; the surface orientation angle 220*a*, 220*b*, 220*c*, 220*d*, 220*e* comprises an angle of 105 degrees or greater; the surface orientation angle 220*a*, 220*b*, 220*c*, 220*d*, 220*e* comprises an angle of 90 degrees to 170 degrees; the surface orientation angle 220*a*, 220*b*, 220*c*, 220*d*, 220*e* comprises an angle of 90 degrees to 150 degrees; the surface orientation angle 220*a*, 220*b*, 220*c*, 220*d*, 220*e* comprises an angle of 90 degrees to 130 degrees; and/or the surface orientation angle 220*a*, 220*b*, 220*c*, 220*d*, 220*e* comprises an angle of 90 degrees 110 degrees. The first surface 15*a*, 15*b*, 15*c*, 15*d*, 15*e* is non-parallel to the second surface 50*a*, 50*b*, 50*c*, 50*d*, 50*e*.

Figure 6A:
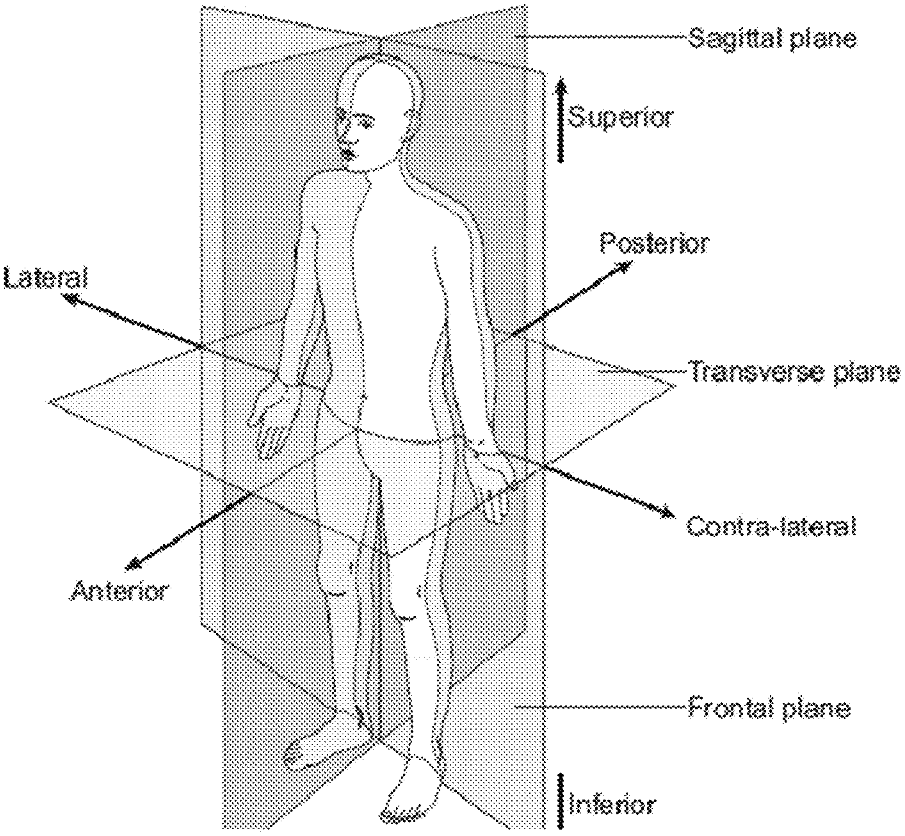
FIGS. 6A-6B display different embodiments of different regions and planes of a human anatomy.
Figure 6B:
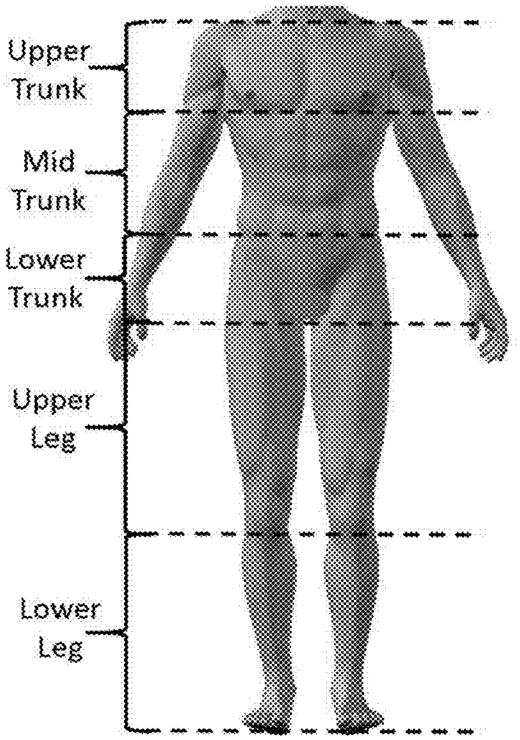
Figure 7A:
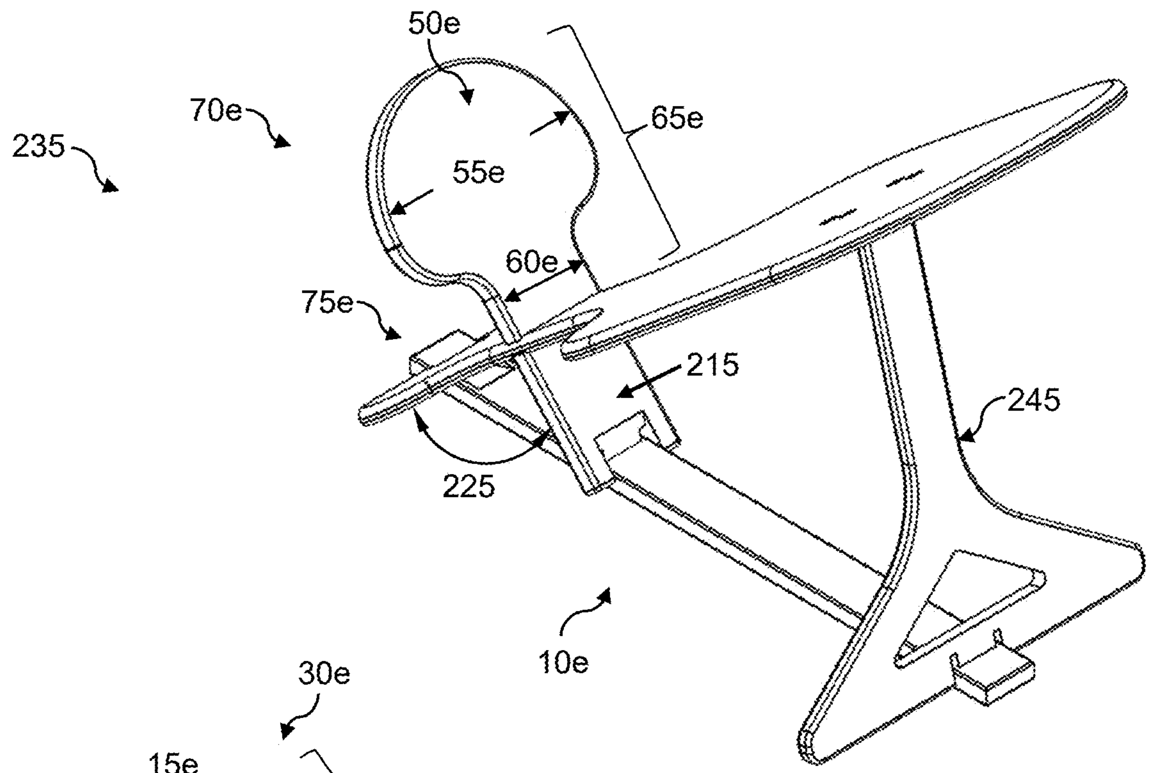
FIGS. 7A-7E display multiple views of a fifth embodiment of a saddle sleeper.
Figure 7B:
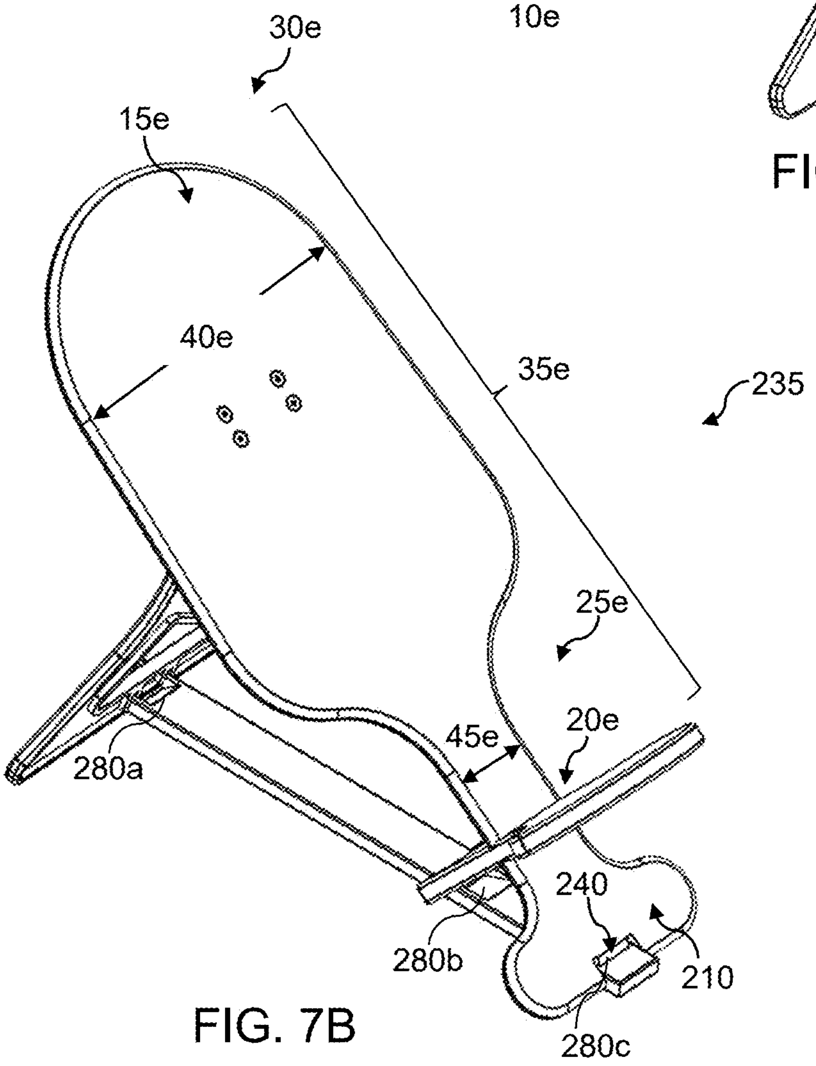
Figure 7C:
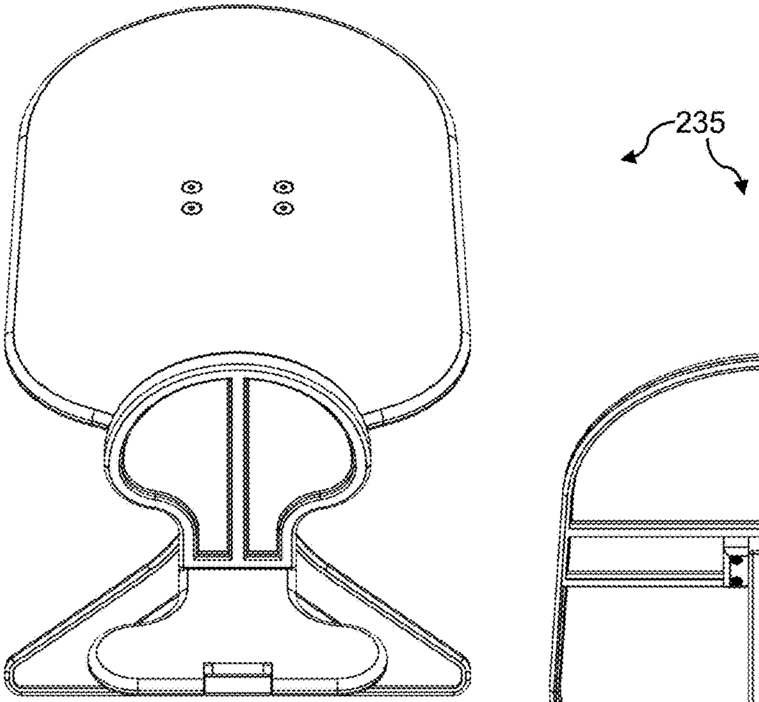
Figure 7D:
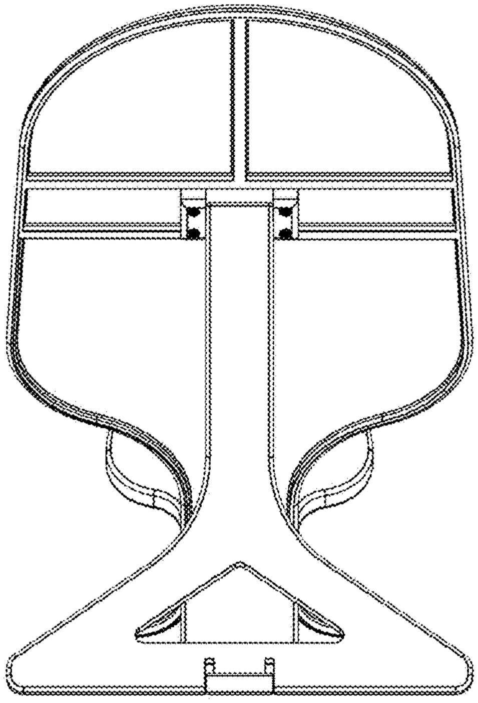
Figure 7E:
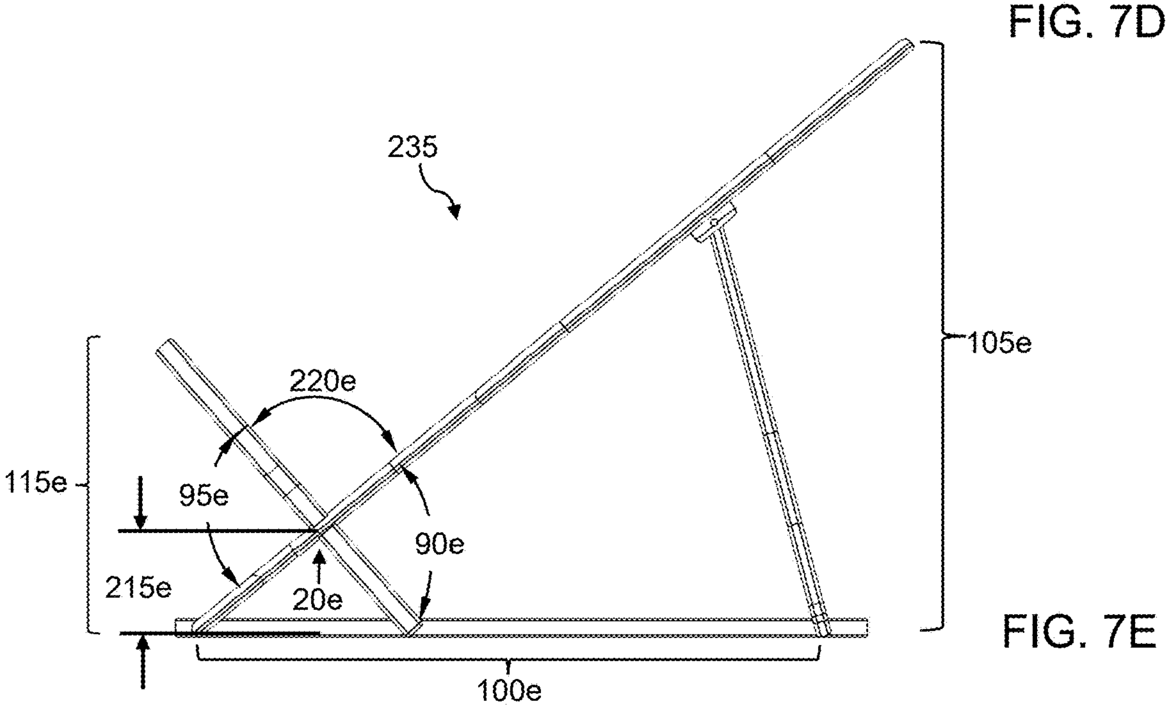
Figure 8:
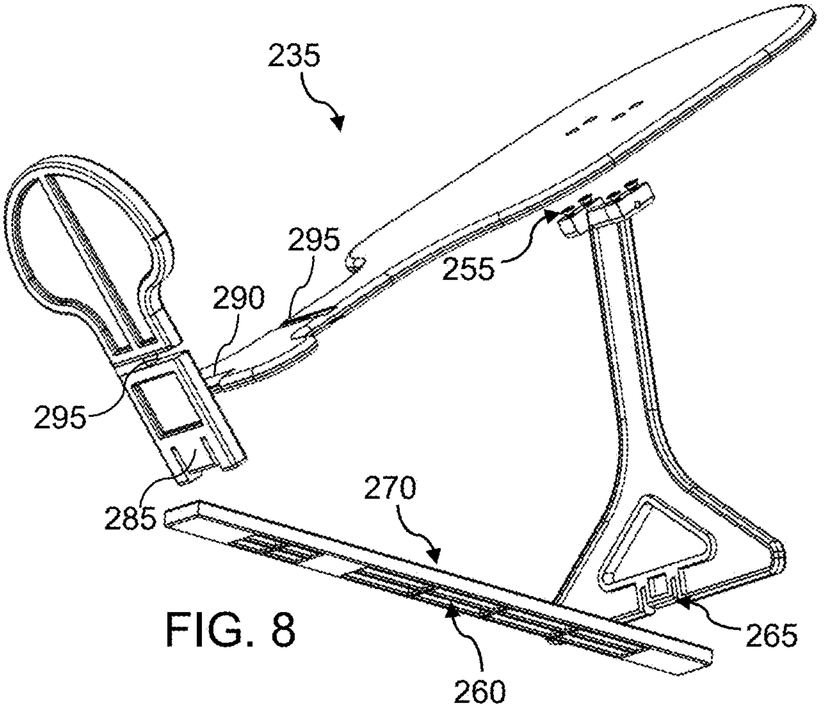
FIG. 8 displays an isometric exploded view of the saddle sleeper of FIGS. 7A-7E.
Figure 9A:
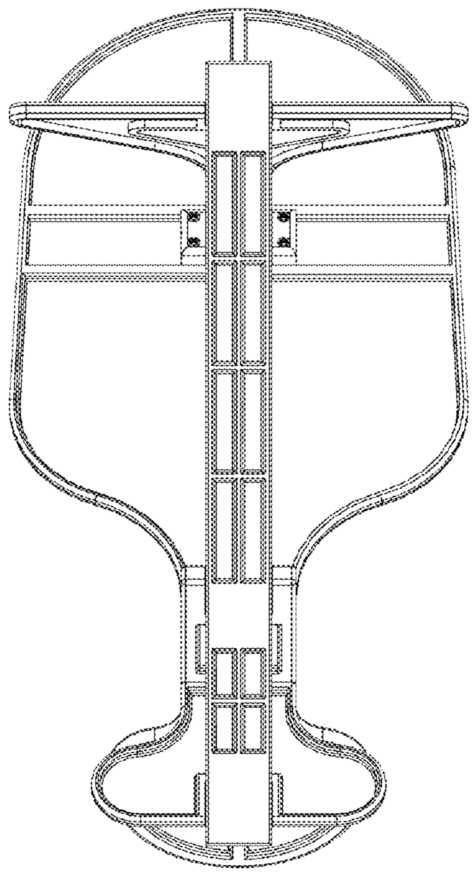
FIGS. 9A-9B display multiple views of the saddle sleeper of FIGS. 7A-7E folded or collapsed.
Figure 9B:
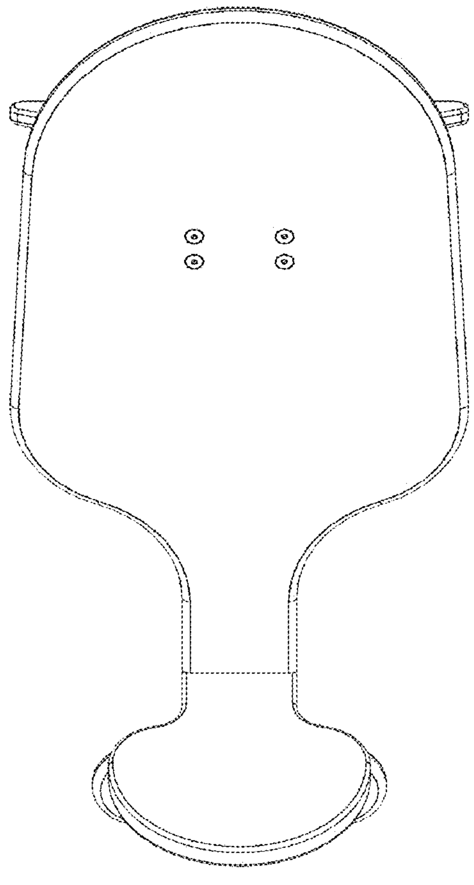

In another embodiment, the first surface 15*a*, 15*b*, 15*c*, 15*d*, 15*e* is intended or configured to contact, engage or support the anterior facing portions and/or the ventral region of a person's upper torso and head. The upper torso comprises a middle trunk and an upper trunk as shown in FIGS. 6A-6B. Accordingly, the second surface 50*a*, 50*b*, 50*c*, 50*d*, 50*e* is intended or configured to contact, engage or support the posterior facing portions and/or the dorsal region of a person's buttocks of the lower trunk. A person's ventral region should be facing at least a portion of the first surface 15*a*, 15*b*, 15*c*, 15*d*, 15*e* to straddle the sleeper 5, 135, 155, 165, 235. The person should position their buttocks onto the second surface 50*a*, 50*b*, 50*c*, 50*d*, 50*e* and position the ventral region of their upper torso onto the first surface 50*a*, 50*b*, 50*c*, 50*d*, 50*e*. The person's upper legs should straddle the intersection region 20*a*, 20*b*, 20*c*, 20*d*, 20*e*, comfortably without straining the upper legs or inner thighs, and the intersection region height 215*a*, 215*b*, 215*c*, 215*d*, 215*e* should enable the knees of the upper legs to be positioned at 90 degrees or substantially 90 degrees while a portion of the person's feet touch the ground. Alternatively, the intersection region height 215*a*, 215*b*, 215*c*, 215*d*, 215*e* should enable the knees of the upper legs to be positioned at 80 degrees or less while a portion of the person's feet touch the ground. The 80 degrees or less creates the open body angle by lowering the angle of the lower body, keeping the spine in alignment and the person properly positioned to sleep. The benefit of this position is that if one leans inward, the body angle remains 90° or wider.

Also, referring to FIGS. 1A-1C, 2A-2B, 3A-3D, 4A-4H, 5D-5F, 7A-7E, 8 and 9A-9B, the sleeper 5, 135, 155, 165, 235 comprises an intersection region 20*a*, 20*b*, 20*c*, 20*d*, 20*e*. The intersection region 20*a*, 20*b*, 20*c*, 20*d*, 20*e* comprises an intersection width and an intersection height 215*a*, 215*b*, 215*c*, 215*d*, 215*e*. The intersection width may comprise the same or substantially the same as the first bottom width 45*a*, 45*b*, 45*c*, 45*d*, 45*e* or the second bottom width 60*a*, 60*b*, 60*c*, 60*d*, 60*e*. The intersection width may comprise the same or substantially the same as the first bottom width 45*a*, 45*b*, 45*c*, 45*d*, 45*e* and the second bottom width 60*a*, 60*b*, 60*c*, 60*d*. The intersection height 215*a*, 215*b*, 215*c*, 215*c* may comprise a height of 3 inches to 10 inches; may comprise a height of 5 inches to 8 inches; may comprise a height of at least 3 inches or greater; may comprise a height of at least 5 inches or greater; and/or may comprise a height of at least 7 inches or greater.

Alternatively, the intersection width may match or substantially match a person's sit bone width. The person may include an adult male, an adult female, a female child and/or a male child. The sit bone width is defined as the ischial tuberosity spacing among men, women and children. The intersection width should be wide enough to allow the person to straddle the sleeper 5, 135, 155, 165, 235, 300, 265, 490 without straining the inner thighs and comfortable enough to match or substantially match a person's sit bone width. The intersection height 215*a*, 215*b*, 215*c*, 215*d*, 215*e* should sufficiently allow the person to bend their legs in a 90-degree position or a substantially 90 degree position enabling at least a portion of the person's feet to touch the ground. Furthermore, at least a portion of the person's feet should be capable of reaching the ground to provide stability while sleeping and preventing them from falling off the sleeper 5, 135, 155, 165, 235, 300, 365, 490.

Also, referring to FIGS. 1A-1C, 2A-2B, 3A-3D, 4A-4H, 5D-5F, 7A-7E, 8, and 9A-9B, the sleeper 5, 135, 155, 165, 235 may comprise a base 10*a*, 10*b*, 10*c*, 10*d*, 10*e*. The base 10*a*, 10*b*, 10*c*, 10*d*, 10*e* supports the first surface 15*a*, 15*b*, 15*c*, 15*d*, 15*e* and/or the second surface 50*a*, 50*b*, 50*c*, 50*d*, 50*e*. The base 10*a*, 10*b*, 10*c*, 10*d*, 10*e* further comprises a flange 140 and/or one or more handle openings 110*a*, 110*b*, 110*c*, 110*d*, 110*e*. The flange 140 may be disposed at or adjacent to the bottom of the base 10*a*, 10*b*, 10*c*, 10*d*, 10*e* and/or surrounds the perimeter of the base 10*a*, 10*b*, 10*c*, 10*d*, 10*e*. The one or more handle openings 110*a*, 110*b*, 110*c*, 110*de* may be disposed onto the front, back, right or left sides of the base 10*a*, 10*b*, 10*c*, 10*d*, 10*e*. The one or more handle openings 110*a*, 110*b*, 110*c*, 110*d*, 110*e* may be sized and configured to receive a portion of a person's hand to enable the sleeper 5, 135, 155, 165, 235 to be portable and moved easily.

In one embodiment, the base 10*a*, 10*b*, 10*c*, 10*d*, 10*e* may further comprise a plurality of channels or openings 280*a*, 280*b*, 280*c*, a top surface 270 and a bottom surface 260. Each of the plurality of channels or openings 280*a*, 280*b*, 280*c* are disposed along the longitudinal length of the base 10*a*, 10*b*, 10*c*, 10*d*, 10*e*. In one embodiment, the base 10*a*, 10*b*, 10*c*, 10*d*, 10*e* may comprise a first channel 280*a*, a second channel 280*b* and a third channel 280*c*. The first channel 280*a* may be sized and configured to receive a portion of a tab 265 of the rod 265, the second channel 280*b* may be sized and configured to receive a portion of tab 290 of the first surface 15*a*, 15*b*, 15*c*, 15*d*, 15*e*, and the third channel 280*c* may be sized and configured to receive a portion of a tab 285 of the second surface 15*a*, 15*b*, 15*c*, 15*d*, 15*e*. The bottom surface 260 may comprise one or more frictional elements (not shown). The frictional elements may prevent the sleeper 5, 135, 155, 165, 235 from sliding.

In one embodiment, the sleeper 5, 135, 155, 165, 235 and/or the base 10*a*, 10*b*, 10*c*, 10*d*, 10*e* may comprise a single-piece unit. The base 10*a*, 10*b*, 10*c*, 10*d*, 10*e* may comprise a first portion 210 and a second portion 215. The first portion 210 of the base 10*a*, 10*b*, 10*c*, 10*d*, 10*e* may comprise a first portion width, and a second portion 215 of the base 10*a*, 10*b*, 10*c*, 10*d*, 10*e* may comprise a second portion width. The first portion 210 of the base 10*a*, 10*b*, 10*c*, 10*d*, 10*e* supports the first surface 15*a*, 15*b*, 15*c*, 15*d*, 15*e*, and the second portion 215 of the base 10*a*, 10*b*, 10*c*, 10*d*, 10*e* supports the second surface 50*a*,50*b*,50*c*,50*d*,50*e*. The first portion width of the base 10*a*, 10*b*, 10*c*, 10*d*, 10*e* may be equal to or greater than the first top width 40*a*, 40*b*, 40*c*, 40*d*, 40*e* of the first surface 15*a*, 15*b*, 15*c*, 15*d*, 15*e* and/or the first bottom width 45*a*, 45*b*, 45*c*, 45*d*, 45*e* of the first surface 15*a*, 15*b*, 15*c*, 15*d*, 15*e*. The second portion width of the base 10*a*, 10*b*, 10*c*, 10*d* may be greater than or equal to the second top width 55*a*, 55*b*, 55*c*, 55*d*, 55*e* and/or the second bottom width 60*a*,60*b*,60*c*, 60*d*, 60*e*. Alternatively, the base 10*a*, 10*b*, 10*c*, 10*d*, 10*e* may taper outwardly from the first surface 15*a*, 15*b*, 15*c*, 15*d*, 15*e* and the second surface 50*a*, 50*b*,50*c*,50*d*,50*e* towards the floor or ground to create a wider perimeter at the ground or floor for stability. The single-piece unit may be manufactured using a standard molding process known in the art.

In another embodiment, the sleeper 5, 135, 155, 165, 235 and/or the base 10*a*, 10*b*, 10*c*, 10*d*, 10*e* may comprise a multi-piece unit. The multi-piece unit relates to a lightweight, compact folding sleeper 5, 135, 155, 165, 235 which is capable of being easily folded from its open sleeping position to a flat planar position. The multi-piece unit is movable from a first position, a flat planar and/or substantially flat planar folded position, to a second position, an open sleeping position. The open sleeping position may comprise adjustable or movable first surface 15*a*, 15*b*, 15*c*, 15*d*, 15*e* relative to the second surface 50*a*,50*b*, 50*c*,50*d*, 50*e* and/or adjustable or movable first and second portions of the base 10*a*, 10*b*, 10*c*, 10*d*, 10*e*.

The base 10*a*, 10*b*, 10*c*, 10*d*, 10*e* may comprise a first portion 210 and a second portion 215. The first portion 210 of the base 10*a*, 10*b*, 10*c*, 10*d*, 10*e* may comprise a first portion width, and a second portion 215 of the base 10*a*, 10*b*, 10*c*, 10*d*, 10*e* may comprise a second portion width. The first portion 210 of the base 10*a*, 10*b*, 10*c*, 10*d*, 10*e* supports the first surface 15*a*, 15*b*, 15*c*, 15*d*, 15*e* and the second portion 215 of the base 10*a*, 10*b*, 10*c*, 10*d*, 10*e* supports the second surface 50*a*,50*b*,50*c*,50*d*,50*e*. The first portion width of the base 10*a*, 10*b*, 10*c*, 10*d*, 10*e* may be equal to or greater than the first top width 40*a*, 40*b*, 40*c*, 40*d*, 40*e* of the first surface 15*a*, 15*b*, 15*c*, 15*d*, 15*e* and/or the first bottom width 45*a*, 45*b*, 45*c*,45*d*, 45*e* of the first surface 15*a*, 15*b*, 15*c*, 15*d*, 15*e*. The second portion width of the base 10*a*, 10*b*, 10*c*, 10*d*, 10*e* may be greater than or equal to the second top width 55*a*, 55*b*, 55*c*, 55*d*, 55*e* and/or the second bottom width 60*a*,60*b*, 60*c*,60*d*,60*e*.

The first portion of the base 10*a*, 10*b*, 10*c*, 10*d*, 10*e* is movable relative to the second portion of the base 10*a*, 10*b*, 10*c*, 10*d*, 10*e* at one or more base orientation angles 225. The one or more base orientation angles 225 may be locked into position by a locking mechanism or latch mechanism 180. In one embodiment, the one or more base orientation angles 225 comprises an obtuse angle. The one or more base orientation angle 225 comprises an angle of 90 degrees or greater; the one or more base orientation angles 225 comprises an angle of 100 degrees or greater; the one or more base orientation angles 225 comprises an angle of 105 degrees or greater; the one or more base orientation angles 225 comprises an angle of 90 degrees to 170 degrees; the one or more base orientation angles 225 comprises an angle of 90 degrees to 150 degrees; the one or more base orientation angles 225 comprises an angle of 90 degrees to 130 degrees; and/or the one or more base orientation angles 225 comprises an angle of 90 degrees 110 degrees. The first portion of the base 10*a*, 10*b*, 10*c*, 10*d*, 10*e* is non-parallel to the second portion of the base 10*a*, 10*b*, 10*c*, 10*d*, 10*e*. In another embodiment, the one or more base orientation angles 225 comprises 180 degrees or substantially 180 degrees when the base 10*a*, 10*b*, 10*c*, 10*d*, 10*e* and/or sleeper 5, 135, 155, 165, 235 is in its folded, flat planar configuration. Alternatively, the one or more base orientation angle 225 comprises 90 degrees to 110 degrees of adjustability when the base 10*a*, 10*b*, 10*c*, 10*d*, 10*e* and/or the sleeper 5, 135, 155, 165, 235, in its one or more open, unfolded configurations. The one or more base orientation angles 225 may comprise a same or different angle than the one or more surface orientation angles 220*a*,220*b*,220*c*,220*d*,220*e*. The one or more base orientation angles 225 may match or substantially match the one or more surface orientation angles 220*a*, 220*b*, 220*c*, 220*d*, 220*e* while in the unfolded one or more positions or configurations.

In another embodiment, the first surface 10*a*, 10*b*, 10*c*, 10*d*, 10*e* is removably connected to the second surface 15*a*, 15*b*, 15*c*, 15*d*, 15*e*. Accordingly, the first slot 295 of the first surface 10*a*, 10*b*, 10*c*, 10*d*, 10*e* engages with the second slot 295 of the second surface 15*a*, 15*b*, 15*c*, 15*d*, 15*e* to removably connect the first surface 10*a*, 10*b*, 10*c*, 10*d*, 10*e* at a first orientation angle 90*a*, 90*b*, 90*c*, 90*d*, 90*d*, 90*e* relative to the second surface 15*a*, 15*b*, 15*c*, 15*d*, 15*e* at a second orientation angle 95*a*, 95*b*, 95*c*, 95*d*, 95*e*.

In one embodiment, the locking or latch mechanism 180 may comprise a rail 185,190 and a rod or stand 195, 245. The locking or latch mechanism 180 may further comprise a pin (not shown). The rail 185, 190 may be disposed on the first surface 15*a*, 15*b*, 15*c*, 15*d*, 15*e*, second surface 50*a*, 50*b*, 50*c*, 50*d*, 50*e*, the base 10*a*, 10*b*, 10*c*, 10*d*, 10*e* a first portion of the base 10*a*, 10*b*, 10*c*, 10*d*, 10*e* and/or a second portion of the base 10*a*, 10*b*, 10*c*, 10*d*, 10*e*. The rail 185, 190 may be disposed along the length and/or the vertical axis of the first surface 15*a*, 15*b*, 15*c*, 15*d*, 15*e* second surface 50*a*,50*b*, 50*c*,50*d*, 50*e*, the base 10*a*, 10*b*, 10*c*, 10*d*, 10*e*, a first portion of the base 10*a*, 10*b*, 10*c*, 10*d*, 10*e* and/or a second portion of the base 10*a*, 10*b*, 10*c*, 10*d*, 10*e*. The rail 185, 190 comprises a first elongated member 185 and a second elongated member 190 that are spaced apart to create a channel, and the first elongated member 185 and second elongated member 190 are parallel to each other. The rod or stand 195, 245 is disposed between the first elongated member 185 and the second elongated member 190 within the channel. The rail 185,190 is movable from a first position, a folded, unlocked position that is parallel to the rail 185, 190, to a second position, an unfolded, locked position.

The rod or stand 195, 245 may comprise one or more notches, holes or hooks 265 disposed at a first end, a second end, and/or along the length that are spaced apart to provide different base orientation angles 225 and/or surface angled orientations. The rod or stand 195, 245 may be pivotally connected to at least a portion of the rail 185,190. Alternatively, the rod or stand 195, 245 may be pivotally connected to at least a portion of the first surface 15*a*, 15*b*, 15*c*, 15*d*, 15*e* and/or a bottom surface of the first surface 15*a*, 15*b*, 15*c*, 15*d*, 15*e*. The rod or stand 195, 245 may comprise a platform 255 that is secured to the at least a portion of the first surface 15*a*, 15*b*, 15*c*, 15*d*, 15*e* and/or a bottom surface of the first surface 15*a*, 15*b*, 15*c*, 15*d*, 15*e*. At least a portion of the rod or stand 195, 245 may be inserted into one or more recess or openings 230, 280*a*, 280*b*, 280*c* disposed onto the second portion 215 and/or the base 10*a*, 10*b*, 10*c*, 10*d*, 10*e*. The recess or opening 230, 280*a*, 280*b*, 280*c* may be sized and configured to receive at least portion of the rod or stand 195, 245. The pin (not shown) may extend through the one or more notches, holes or hooks transversely to prevent the rod or stand 195 from sliding or moving further, thus locking the rod or stand 195 at the selected one or more base orientation angles 225. Alternatively, the pin (not shown) may engage with the one or more notches, holes or hooks to prevent the rod or stand 195 from sliding, thus locking the rod or stand 195 at the selected on or more base orientation angles 225.

Also, referring to FIGS. 1A-1C, 2A-2B, 3A-3D, 4A-4H, 5D-5F, 7A-7E, 8, 11A-11G, 12, 13A-13G, and 14 the sleeper 5, 135, 155, 165, 235, 300, 365, 490 may comprise a weight. The sleeper 5, 135, 155, 165, 235, 300, 365, 490 should be lightweight to increase portability. The weight of the sleeper 5, 135, 155, 165, 235, 300, 365, 490 comprises at least 1 lb or greater. The weight may further comprise 1 lb to 10 lb. Alternatively, the sleeper 5, 135, 155, 165, 235, 300, 365, 490 may comprise 10 lb or less. In another embodiment, the sleeper 5, 135, 155, 165, 235, 300, 365, 490 may include wheels or other portability mechanisms. In another embodiment, the sleeper 5, 135, 155, 165, 235, 300, 365, 490 may comprise one or more colors and/or a combination of colors.

Also, referring to FIGS. 1A-1C, 2A-2B, 3A-3D, 4A-4H, 5D-5F, 7A-7E, 8, 11A-11G, 12, 13A-13G, and 14, the sleeper 5, 135, 155, 165, 235, 300, 365, 490 comprises a material. The material may be a plastic, foam, or metal. The plastic may comprise a thermoset or thermoplastic. The plastic may comprise polypropylene (PP), polyethylene (PE), polyvinyl chloride (PVC), acrylonitrile butadiene styrene (ABS), polycarbonate (PC), and/or any combination thereof. The foam may comprise high-density polystyrene foam (HDPS), expanded polystyrene foam (EPS), polyurethane foam, craft foam, and/or any combination thereof. In another embodiment, the saddle sleeper may be solid or hollow. The material may further comprise a biodegradable material, an environmentally friendly or eco-friendly material.

Also, referring to FIGS. 1A-1C, 2A-2B, 3A-3D, 4A-4H, 5D-5F, 7A-7E, 8, 11A-11G, 12, 13A-13G, and 14, the sleeper 5, 135, 155, 165, 235, 300, 365, 490 may comprise one or more pads 125,130. The one or more pads 125, 130 should increase comfort of the sleeper 5,135,155, 165. The one or more pads 125,130 may be fixed or removably connected. The one or more pads 125, 130 may be disposed onto the first surface 15*a*, 15*b*, 15*c*, 15*d*, 15*e* or the second surface 50*a*,50*b*,50*c*,50*d*,50*e*. The one or more pads 125, 130 may be disposed onto each of the first surface 15*a*, 15*b*, 15*c*, 15*d*, 15*e* and the second surface 50*a*,50*b*,50*c*,50*d*,50*e*. The one or more pads 125, 130 may comprise components around the household, such as pillows, towels, or sheets that can increase the comfort of the sleeping child. The one or more pads 125, 130 may comprise attachment mechanisms, the attachment mechanisms include Velcro, adhesive, adhesive strips, and/or any mechanisms known in the art. The one or more pads 125, 130 may comprise removable coverings. The removable coverings may be separately washed and disposed onto the one or more pads 125,130.

Also, referring to FIGS. 1A-1C, 2A-2B, 3A-3D, 4A-4H, 5D-5F, 7A-7E, 8, 11A-11G, 12, 13A-13G, and 14, the sleeper 5, 135, 155, 165, 235, 300, 365, 490 may comprise one or more guards or stops (not shown). The stop may be used to help prevent falling of the sleeping person. The stop may comprise a wall and/or a bar, and/or other mechanism to help prevent falls. The one or more rails or stops may be disposed onto the first surface 15*a*, 15*b*, 15*c*, 15*d*, 15*e* or the second surface 50*a*,50*b*,50*c*,50*d*,50*e*. The one or more guards or stops may be disposed onto each of the first surface 15*a*, 15*b*, 15*c*, 15*d*, 15*e* and the second surface 50*a*,50*b*, 50*c*,50*d*,50*e*. The one or more guards extend along at least a portion of a first length 35*a*, 35*b*, 35*c*, 35*d*, 35*e* of the first surface 15*a*, 15*b*, 15*c*, 15*d*, 15*e* and/or at least a portion of a second length 65*a*,65*b*,65*c*, 65*d*, 65*e* of the second surface 50*a*,50*b*,50*c*,50*d*,50*e*. In one embodiment, a first one or more guards are disposed on right side of the first surface 15*a*, 15*b*, 15*c*, 15*d*, 15*e* and a second one or more guards are disposed on the left side of the first surface 15*a*, 15*b*, 15*c*, 15*d*, 15*e*. Alternatively, the one or more guards or stops may be disposed onto the right side, left side, top end and/or bottom end of the first surface 15*a*, 15*b*, 15*c*, 15*d*, 15*e* and/or the second surface 50*a*,50*b*,50*c*,50*d*,50*e*.

Figure 10A:
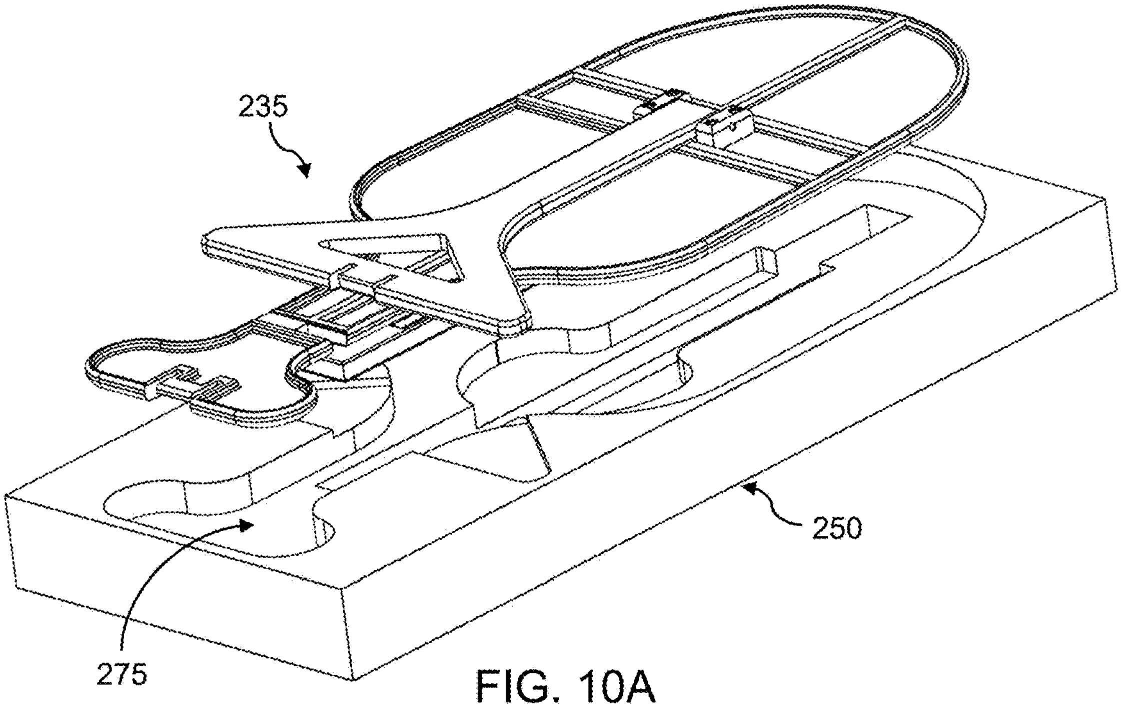
FIGS. 10A-10C displays multiple views of the saddle sleeper of FIGS. 7A-7E folded or collapsed and its packaging.
Figure 10B:
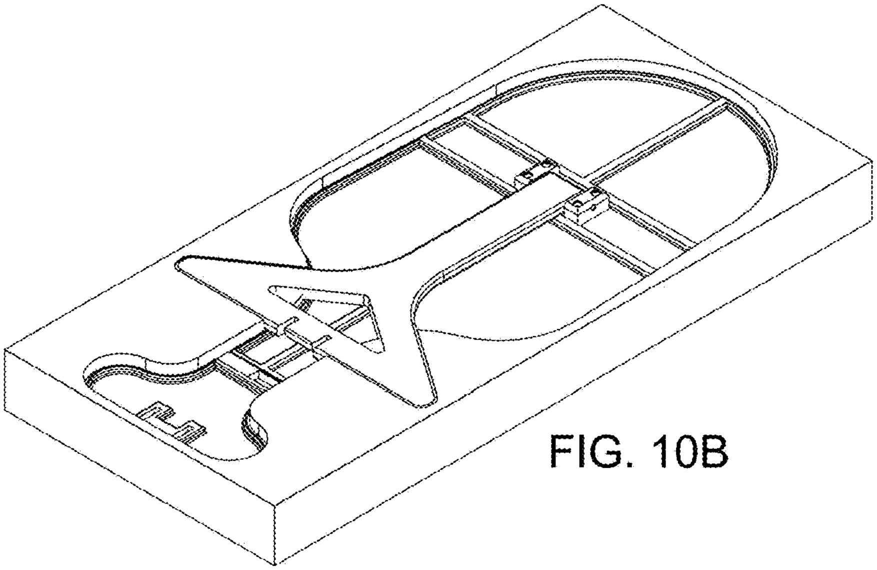
Figure 10C:
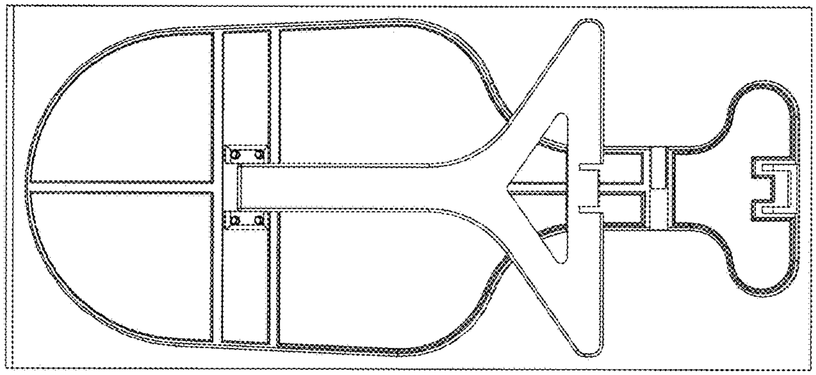
Figure 11A:
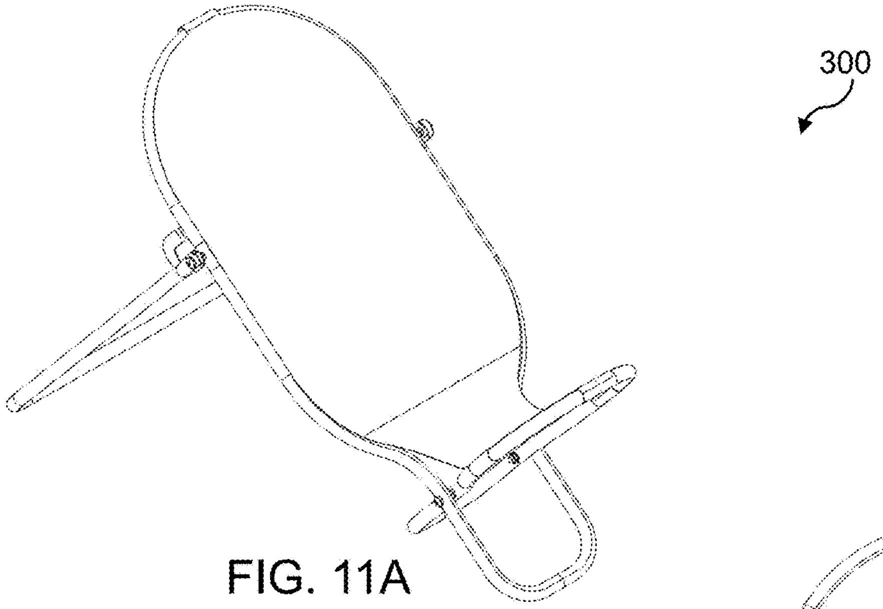
FIGS. 11A-11G displays multiple views of a sixth embodiment of a saddle sleeper.
Figure 11B:
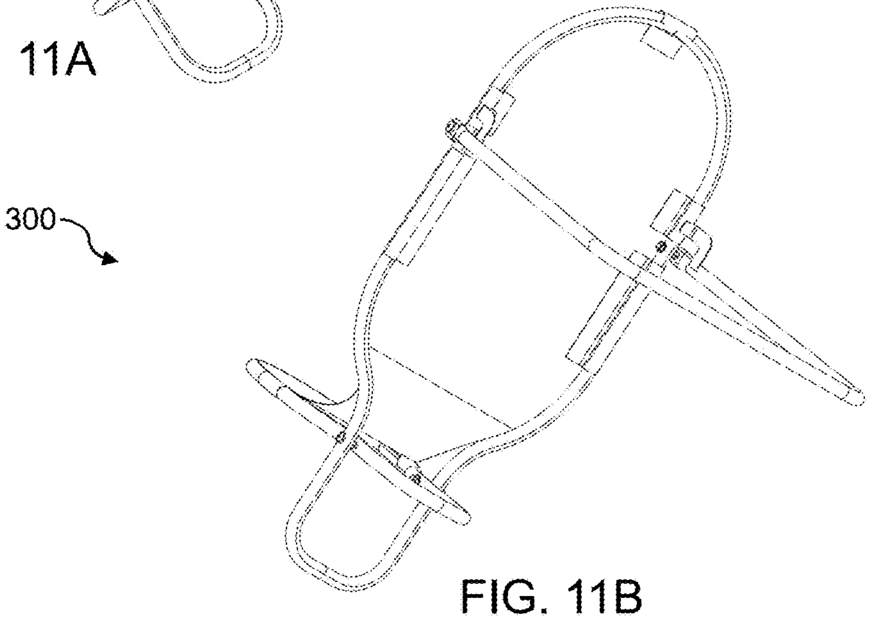
Figure 11C:
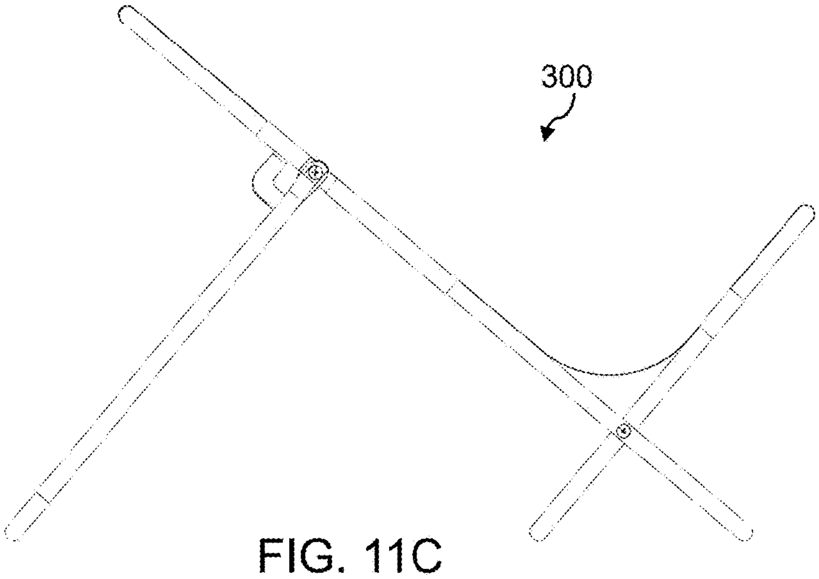
Figure 11D:
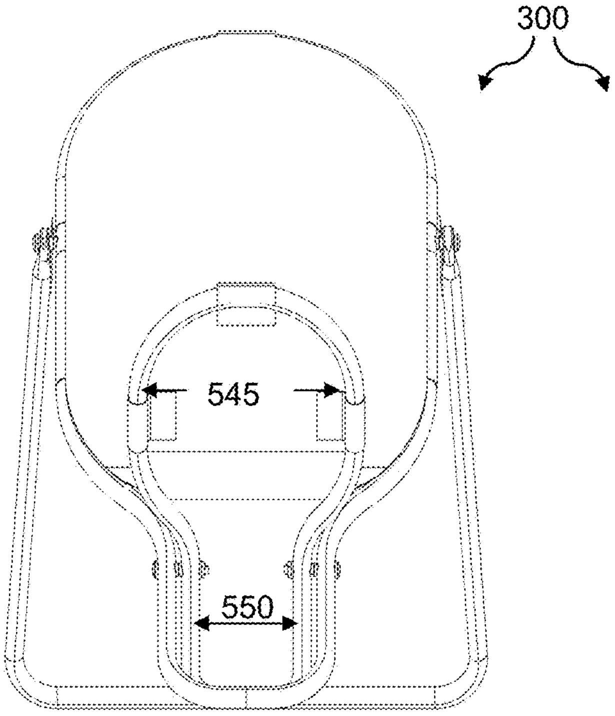
Figure 11E:
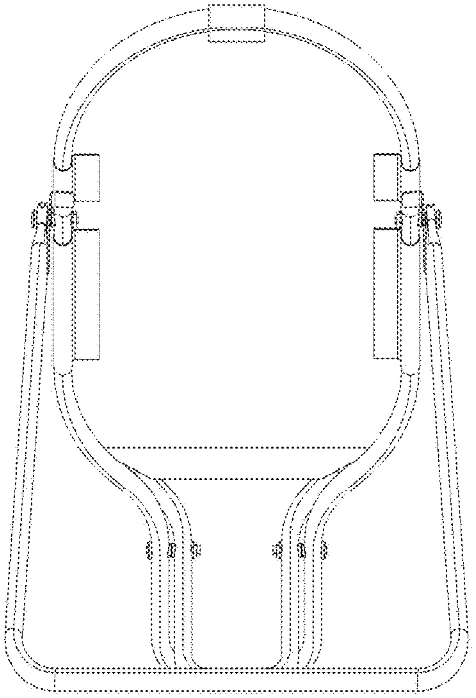
Figure 11F:
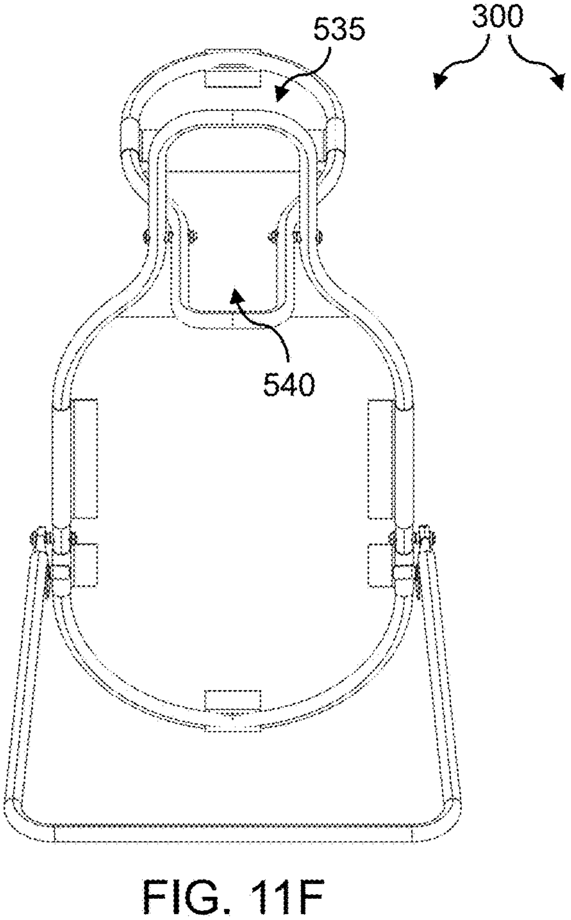
Figure 11G:
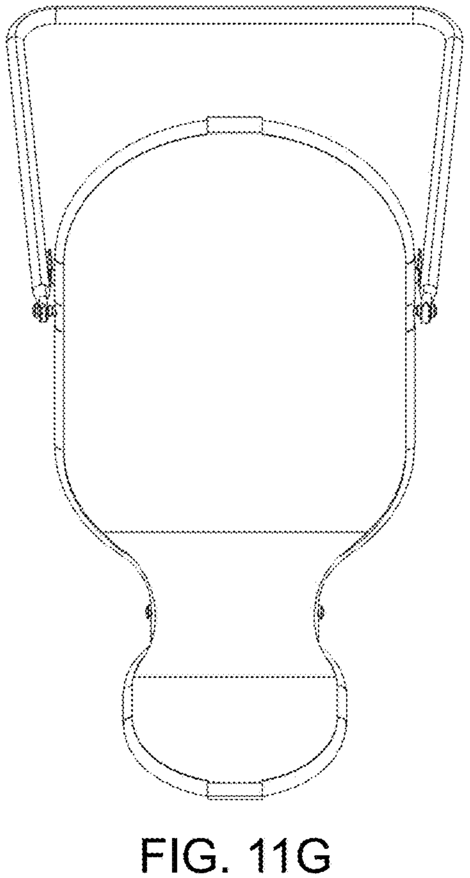
Figure 12:
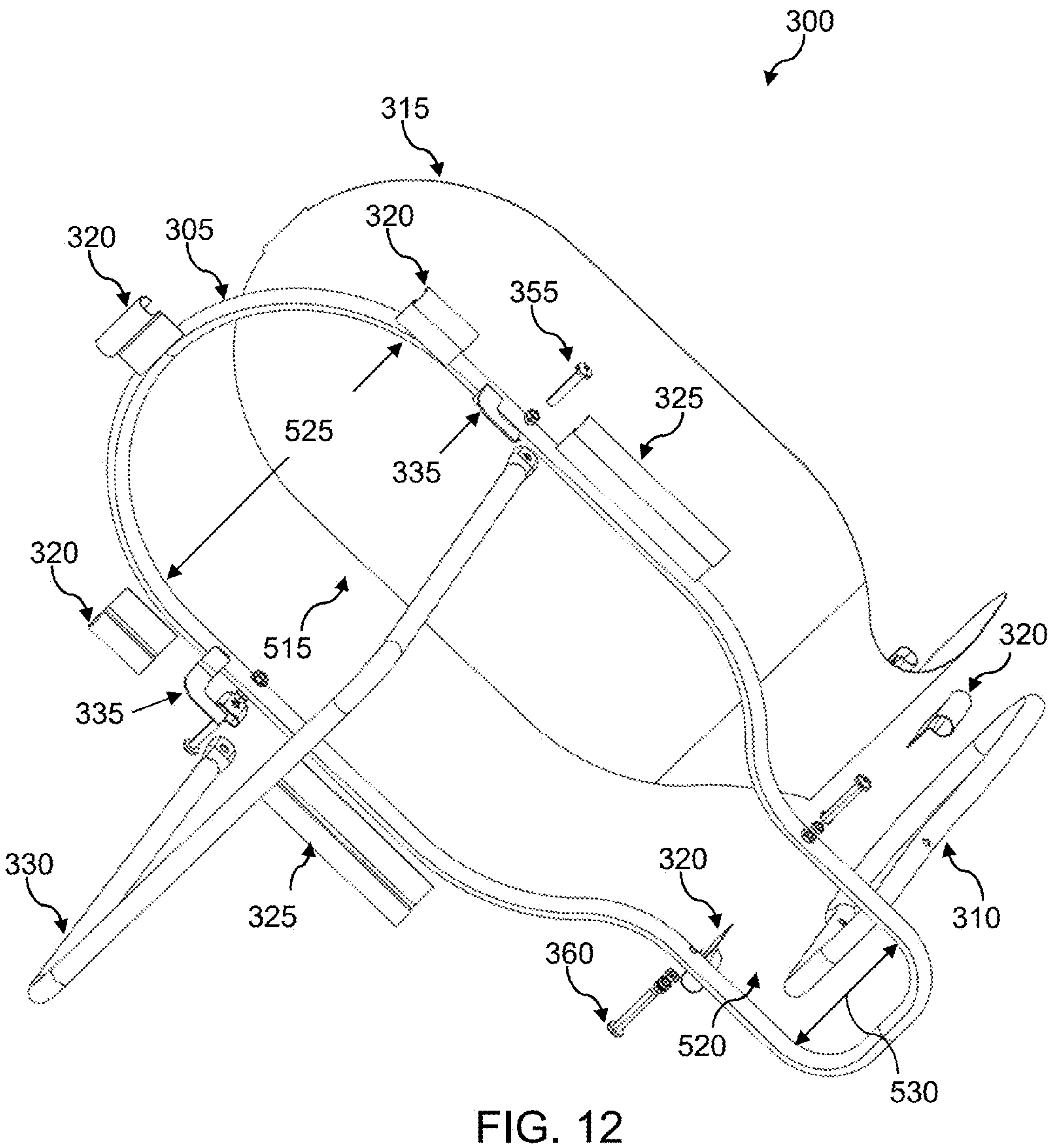
FIG. 12 displays an exploded view of the saddle sleeper of FIGS. 11A-11G.
Figure 13A:
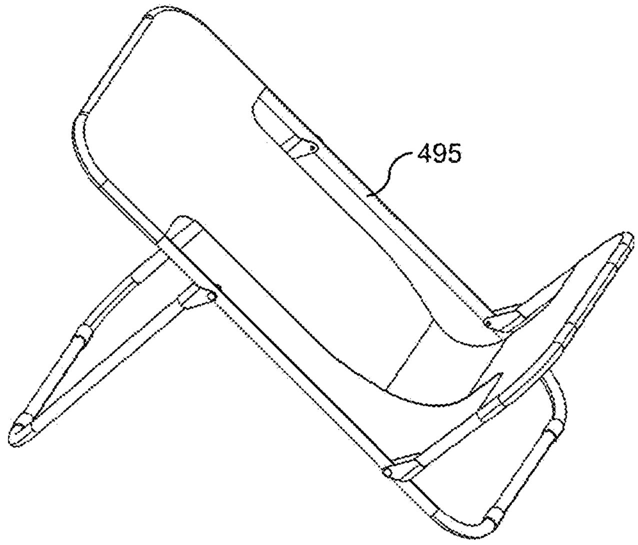
FIGS. 13A-13G displays multiple views of a seventh embodiment of a saddle sleeper.
Figure 13B:
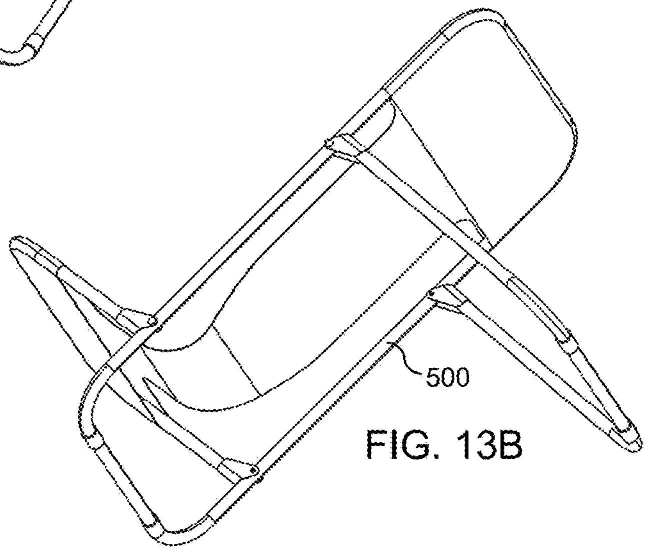
Figure 13C:
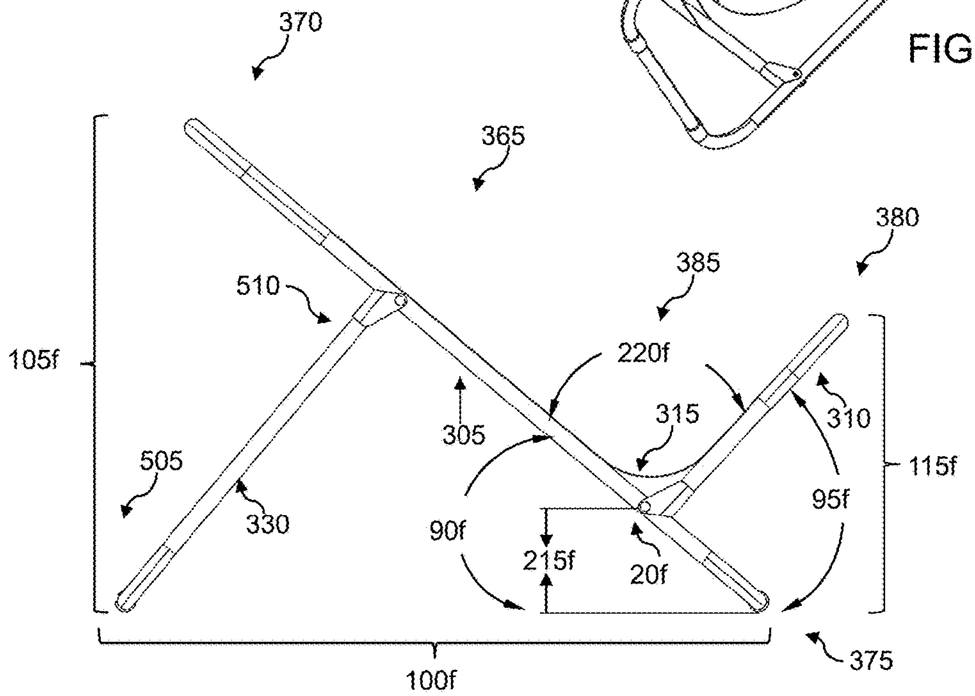
Figure 13D:
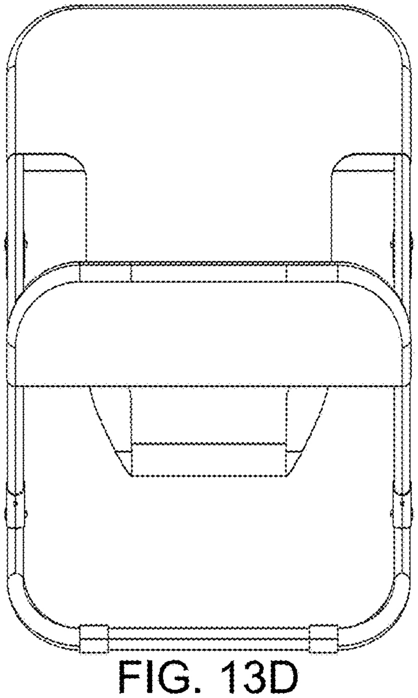
Figure 13E:
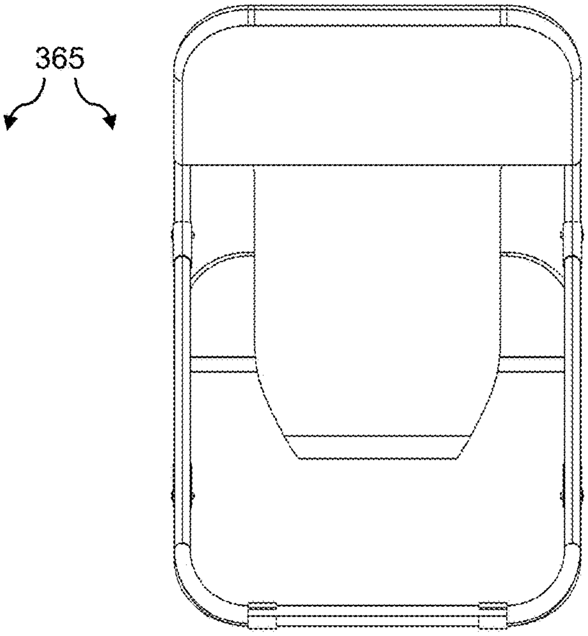
Figure 13F:
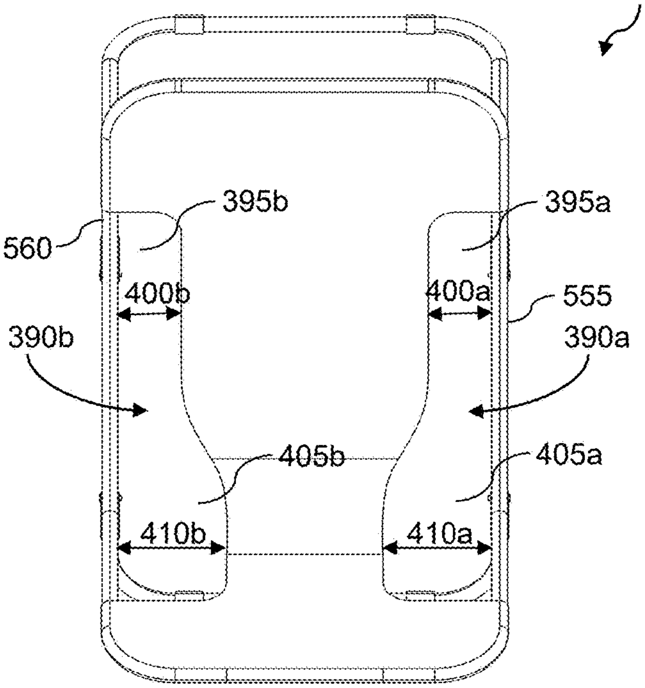
Figure 13G:
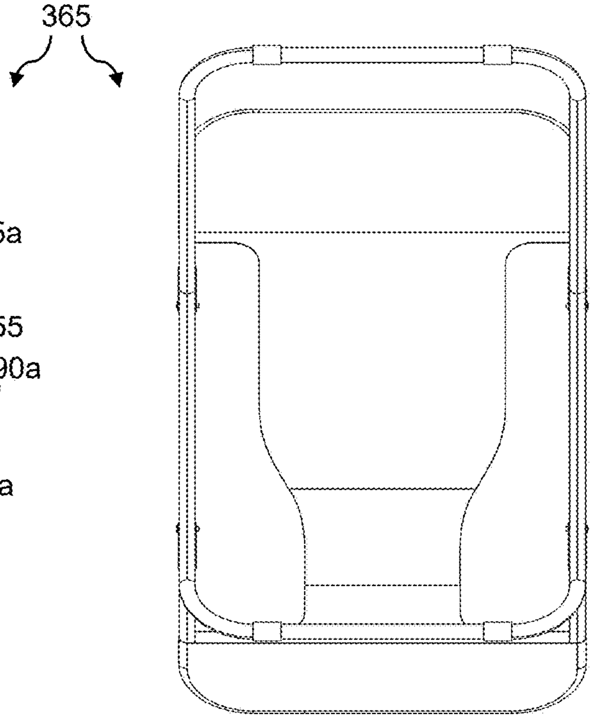
Figure 14:
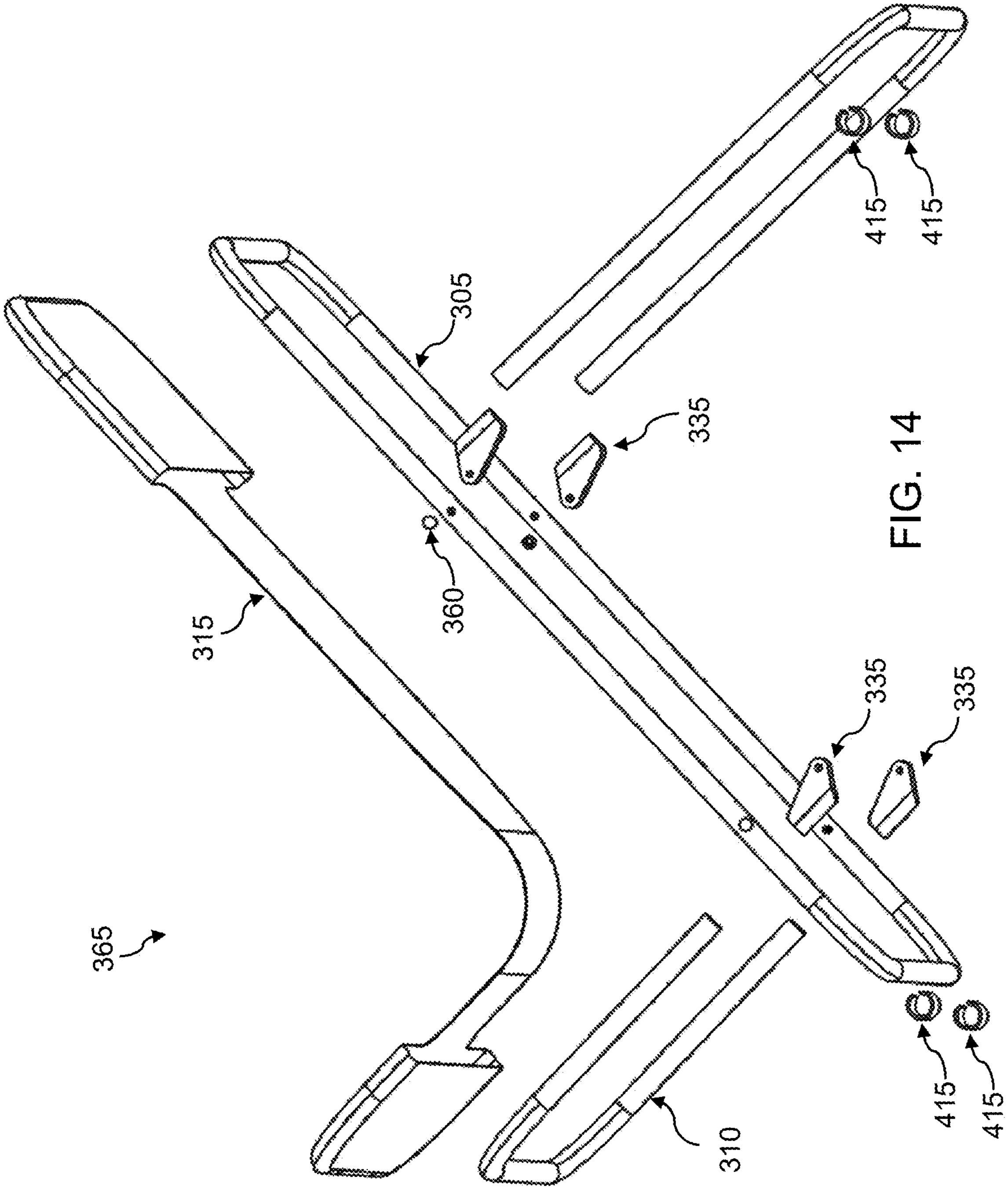
FIG. 14 displays an exploded view of the saddle sleeper of FIGS. 13A-13G.
Figure 15A:
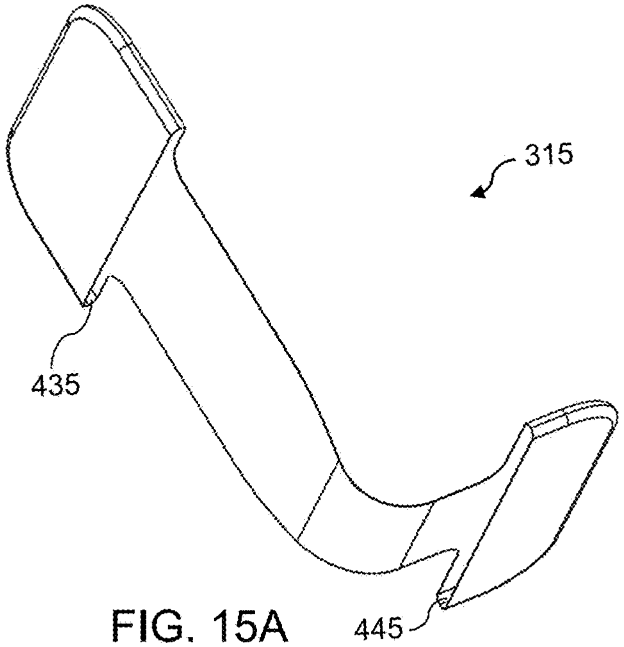
FIGS. 15A-15C displays multiple views of one embodiment of a textile for the saddle sleeper of FIGS. 13A-13G.
Figure 15B:
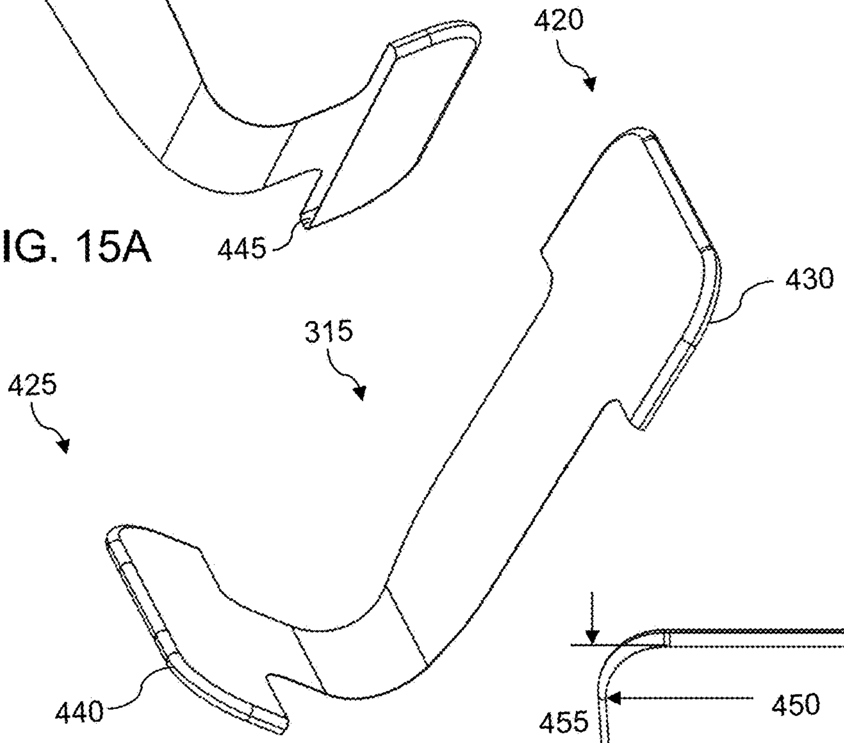
Figure 15C:
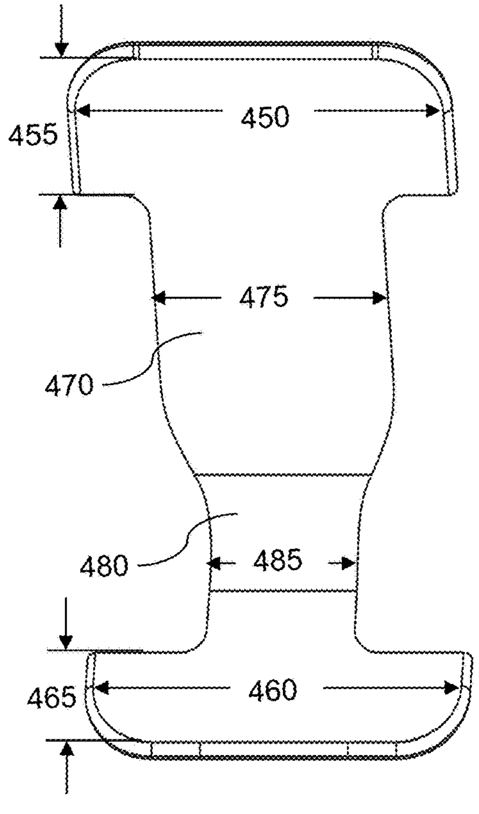

Also, referring to FIGS. 1A-1C, 2A-2B, 3A-3D, 4A-4H, 5D-5F, 7A-7E, 8, 11A-11G, 12, 13A-13G, and 14, the sleeper 5, 135, 155, 165, 235, 300, 365, 490 may comprise one or more packaging 250 as shown in FIGS. 10A-10C. The packaging 250 may comprise a cavity 275 that substantially conforms to the shape and/or the collapsible shape of the sleeper 5, 135, 155, 165, 235, 300, 365, 490.

Collapsible Sleepers

The general aim of the collapsible sleeper 165, 235, 300, 365, 490 is to provide new and useful improvement in a sleeper having one or more pivotable frame structures that are relatively arranged to provide adjustment to desired angles of inclinations and portability to help reduce sickness symptoms of a person anywhere the person desires to sleep. The collapsible sleeper 165, 235, 300, 365, 490 may further comprise a flexible textile that includes a removably connected securing means to the pivotal frame structures, thus allowing the flexible textile to be removed for washing or replacement.

FIGS. 11A-11G, 12, 13A-13G, and 14 illustrate multiple views of a sixth and seventh embodiment of a saddle sleeper 300, 365. The sleeper 300, 365 comprises a first frame 305, a second frame 310, a third frame 330, and a flexible textile 315. The sleeper 300, 365 may further comprise a connecting mechanisms 360, textile fastening elements 320, an angle restrictor 335, and/or friction elements or protectors 415. The sleeper 300, 365 may further comprise a base (not shown).

In one embodiment, the first frame 305 having a first frame upper surface 495, a first frame lower surface 500, a first frame first end 370 and a first frame second end 370. The second frame 310 including a second frame first end 380 and a second frame second end 385, the second frame second end 385 pivotally connected to the first frame 305 at a first location. The second frame 310 being movable relative to the first frame 305 from a first position being parallel to the first frame upper surface 495 to a second position having a first orientation angle 95*f* relative to the first frame 305 or the ground. The third frame 330 including a third frame first end 505 and a third frame second end 510, the third frame second end 510 pivotally connected to the first frame 305 at a second location, the third frame 330 being movable relative to the first frame 305 from a first position being parallel to the first frame lower surface 500 to a second position having a second orientation angle 90*f* relative the first frame or the ground, the first location is different than the second location.

In one embodiment, the first frame 305 and the second frame 310 comprises a non-uniform shape. The first frame 305 comprises a first portion 515 having a first portion width 525 and a second portion 520 having a second portion width 530. The first portion width 525 of the first frame 305 is greater than the first portion width 530 of the first frame 305. The second frame 310 comprises a first portion 535 having a first portion width 545 and a second portion 540 having a second portion width 550. The first portion width 545 of the second frame 310 is greater than the second portion width 550 of the second frame 310.

In another embodiment, the first frame 305 and the second frame 310 comprises a uniform shape. The first portion width 525 of the first frame 305 is the same as the second portion width 530 of the first frame 305. Accordingly, the first portion width 545 of the second frame 310 is the same as the second portion width 540 of the second frame 310. The widths are uniform along the longitudinal axis (not shown) of each of the first frame 305 and the second frame 310. The third frame 330 may comprise a uniform shape or a non-uniform shape.

In another embodiment, at least a portion of the second portion 540 of the second frame 310 extends through the second portion 520 of the first frame 305 to create a first part of a base. At least a portion of the second end 385 of the second frame 310 extends through the second end 375 of the first frame 305. Alternatively, at least a portion of the second frame 310 extends away from a top surface 495 of the first frame 305, and at least a portion of the third frame extends away from a bottom surface 500 of the first frame 305.

At least a portion of a third frame 330 and a portion of the first frame 305 may be pivotally connected to angle restrictor 335. At least a portion of the second end 510 of the third frame 330 and a portion of the first frame 305 may be pivotally connected to angle restrictor 335. At least a portion of the second frame 310 and a portion of the first frame 305 may be pivotally connected to an angle restrictor 335. At least a portion of the second end 385 of the second frame 310 and at least a portion of the first frame 305 may be pivotally connected to the angle restrictor 335. The angle restrictor 335 restricts the movement of the third frame 330 relative to the first frame 305 to a desired angle. The pivotal connections may comprise connecting mechanisms 360. The connecting mechanisms 360 may include hinges (locking or unlocking), ball and joint mechanisms, a pin joint, and/or any combination thereof. In one exemplary embodiment, the sleeper 300, 365 may comprise a pin joint pivotal connection. The pin joint may include rivets or pins.

The second surface or orientation angle **90*f* is positioned relative to the ground. The second surface angle 90*f* comprises an angle of at least 20 degrees or greater; comprises an angle of at least 25 degrees or greater; comprises an angle of 30 degrees or greater; comprises an angle of 35 degrees or greater; comprises an angle of 40 degrees or greater; comprises an angle of 20 degrees to 50 degrees; comprises an angle of 30 degrees to 50 degrees; and/or comprises an angle of 35 degrees to 45 degrees. The second surface or orientation angle 90*f* may be non-parallel to the ground and/or the second frame 310. In one embodiment, the second surface or orientation angle 90*f*** may comprise 39 to 48 degrees. In another exemplary embodiment, the second surface or orientation angle may comprise 39, 42, 45 and 48 degrees.

The first frame 305 comprises a first surface height **105*f*. The first frame height 105*f* comprises a height of at least 15 inches or greater; the first frame height 105*f* comprises of at least 20 inches or greater; the height comprises at least 23 inches or greater; the height comprises 15 inches to 25 inches; the height comprises at least 20 inches to 25 inches; and/or the height comprises 22 inches to 24 inches. The first frame height 105*f* may be at or adjacent to the first end 370 of the first frame 370**.

The first surface or orientation angle **95*f* is positioned relative to the floor and/or the first frame 305. The first surface or orientation angle 95*f* comprises an angle of at least 20 degrees or greater; comprises an angle of at least 25 degrees or greater; comprises an angle of 30 degrees or greater; comprises an angle of 35 degrees or greater; comprises an angle of 40 degrees or greater; comprises an angle of 20 degrees to 50 degrees; comprises an angle of 30 degrees to 50 degrees; and/or comprises an angle of 35 degrees to 45 degrees. The first surface or orientation angle 95*f* may be non-parallel to the ground and/or the first frame 305**.

The second frame 310 further a second frame height **115*f*. The second frame height 115*f* comprises a height of at least 15 inches or greater; the first frame height 105*f*** comprises of at least 10 inches or greater; the height comprises at least 13 inches or greater; the height comprises a 10 inches to 15 inches; the height comprises at least 10 inches to 14 inches; and/or the height comprises 12 inches to 14 inches.

In another embodiment, the first frame 305 is in a total surface orientation angle **220*f* relative to the second frame 310. The total surface orientation angle 220*f* comprises an obtuse angle. The total surface orientation angle 220*f* comprises an angle of 90 degrees or greater; the total surface orientation angle 220*f* comprises an angle of 100 degrees or greater; the total surface orientation angle 220*f* comprises an angle of 105 degrees or greater; the total surface orientation angle 220*f* comprises an angle of 90 degrees to 170 degrees; the total surface orientation angle 220*f* comprises an angle of 90 degrees to 150 degrees; the total surface orientation angle 220*f* comprises an angle of 90 degrees to 130 degrees; and/or the total surface orientation angle 220*f* comprises an angle of 90 degrees 110 degrees. The first frame 305 is non-parallel to the second frame 310**.

In another embodiment, the sleeper 300, 365 comprises an intersection region **20*f*. The intersection region 20*f* comprises an intersection width and an intersection height 215*f*. The intersection height 215*f* may comprise a height of 3 inches to 10 inches; may comprise a height of 5 inches to 8 inches; may comprise a height of at least 3 inches or greater; may comprise a height of at least 5 inches or greater; and/or may comprise a height of at least 7 inches or greater. The intersection region 20*f* and/or the intersection height 215** is lower than typical chairs to be able accommodate a person kneeling, and the persons lower extremities may contact the ground (e.g., the person is kneeling, which the knees, shins and/or feet may partially contact the ground).

Alternatively, the intersection width may match or substantially match a person's sit bone width. The person may include an adult male, an adult female, a female child and/or a male child. The sit bone width is defined as the ischial tuberosity spacing among men, women and children. The intersection width should be wide enough to allow the person to straddle the sleeper 5, 135, 155, 165, 235, 300, 265, 490 without straining the inner thighs and comfortable enough to match or substantially match a person's sit bone width. The intersection height **215*f* should sufficiently allow the person to bend their legs in a 90-degree position or a substantially 90 degree position enabling at least a portion of the person's feet, knees and/or shins to touch the ground (see FIG. 2A). Furthermore, at least a portion of the person's feet should be capable of reaching the ground to provide stability while sleeping and preventing them from falling off the sleeper 5, 135, 155, 165, 235, 300, 365, 490**.

In another embodiment, the sleeper 300, 365 may further comprise a base (not shown). The base supports at least a portion of the third frame 330 and/or at least a portion of the first frame 305. The base comprises a base width 100*f*. The base may comprise a first end and a second end. At least a portion of the first end of the base may be removably connected to the first end 505 of the third frame 330 and removable connected to the second end 375 of the first frame 305. The base may comprise a first one or more grooves positioned at a first end or a second end. Each of the one or more grooves positions the first frame 305 at different orientation angles 90*f*. The different orientation angles 90*f* may comprise 35 degrees to 50 degrees. Alternatively, the orientation angles 90*f* may comprise 39 degrees, 42 degrees, 45 degrees and/or 48 degrees. The base provides further support and stability for the sleeper 300, 365 if desired.

In another embodiment, the sleeper 300, 365 may comprise a flexible textile 315. The flexible textile 315 including a first section 430, a second section 470, 480, and a third section 440, the second section 470, 480 positioned between the first section 430 and the third section 440. The first section 430 including first section width 450 and a first section height 455. The first section 430 further comprises a pocket 435. The first section 430 being removably coupled to a portion of the first frame first end 370.

The second section 470, 480 including a second section width 475, 485. In another embodiment, the second section 470, 480 may comprise a first portion 470 having a first portion width 475 and a first portion perimeter. The second portion 480 having a second portion width 485 and a second portion perimeter. The first portion width 475 may be greater than the second portion width 485. The second section 470, 480 may be suspended between the first section 430 and the second section 440. Alternatively, the section 470, 480 may be suspended between the first end 370 of the first frame 305 and the first end 380 of the second frame 310.

A first side of the first portion perimeter of the first portion 470 of the second section may be spaced apart from a first longitudinal frame member 555 of the first frame 305 to create a first passageway 395*a* and a second side of the second portion perimeter of the second portion 580 may be spaced apart from a second longitudinal frame member 560 of the first frame 305 to create a second passageway 395*b*. Alternatively, the first portion perimeter of the first portion 470 is spaced apart from the first longitudinal frame member 555 and the second longitudinal frame member 560 to create a first and second passageway 395*a*, 395*b*. The first passageway 395*a* includes a first passageway width 400*a* and the second passageway 395*b* includes a second passageway width 400*b*. The first passageway width 400*a* is the same as the second passageway width 400*b*. The first passageway width 400*a* and the second passageway width 400*b* is sized and configured to receive a portion of a person's upper extremities.

A first side of the second portion perimeter of the second portion 480 may be spaced apart from a first longitudinal frame member 555 of the first frame 305 to create a third passageway 405*a* and a second side of the second portion perimeter of the second portion 480 may be spaced apart from a second longitudinal frame member 560 of the first frame 305 to create fourth passageway 405*b*. Alternatively, the second portion perimeter of the second portion 480 is spaced apart from the first longitudinal frame member 555 and the second longitudinal frame member 560 to create a third and fourth passageway 400*a*, 400*b*. The third passageway 405*a* includes a third passageway width 410*a* and the fourth passageway 405*b* comprises a fourth passageway width 410*b*. The third passageway width 410*a* is the same as the fourth passageway width 410*b*. The first and second passageway widths 400*a*, 400*b* is smaller than the third and fourth passageway widths 410*a*, 410*b*. The third passageway width 410*a* and the fourth passageway width 410*b* is sized and configured to receive a portion of a person's lower extremities.

In another embodiment, the second section perimeter of the second section 470, 480 is spaced apart from the longitudinal frame members 555, 560 of the first frame 305 to create a first and second passageway 390*a*, 390*b*. The first and second passageway 390*a*, 390*b* comprises a non-uniform width. The first and second passageway 390, 390*b* may comprise a first portion 395*a*, 395*b* and a second portion 405*a*, 405*b*. The first portion 395*a*, 395*b* comprises a first portion passageway width 400*a*, 400*b*. The second portion 405*a*, 405*b* comprises a second portion passageway width 410*a*, 410*b*. The first portion passageway width 400*a*, 400*b* is smaller than the second portion passageway width 410*a*, 410*b*. The first portion passageway width 400*a*, 400*b* is sized and configured to receive a portion of a person's upper extremities. The second portion passageway width 410*a*, 410*b* is sized and configured to receive a portion of a person's lower extremities.

The third section 440 including a third section width 460 and a third section height 465. The third section 440 being removably coupled to a portion of the second frame first end 380. The second section width 475, 485 is smaller than the first section width 450 and the third section width 460. The third section 440 further comprises a pocket 445. The third section 440 being removably coupled to a portion of the second frame first end 380. The first section width 450 may be the same as the third section width 460. The first section height 455 may be the same as and/or different than the third section height 465.

Figure 2A:
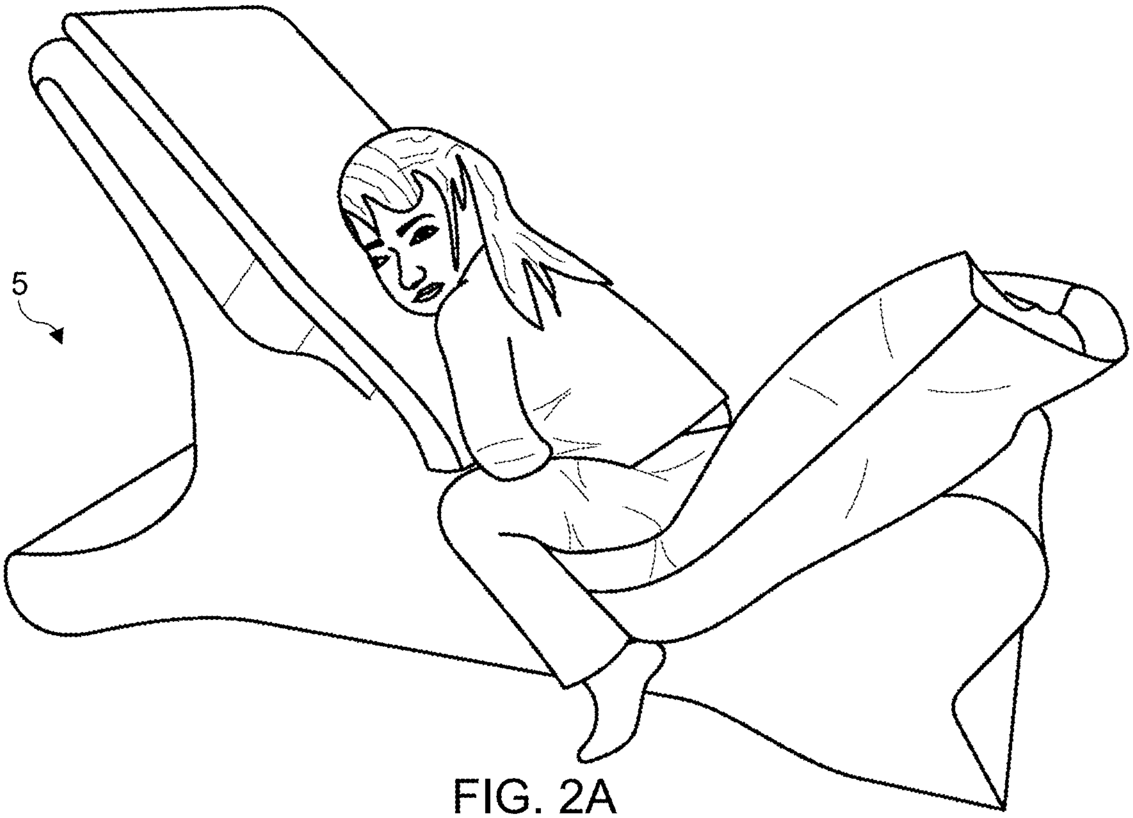
FIGS. 2A-2B display multiple views of a young child sleeping the saddle sleeper of FIGS. 1A-1C with pads.
Figure 2B:
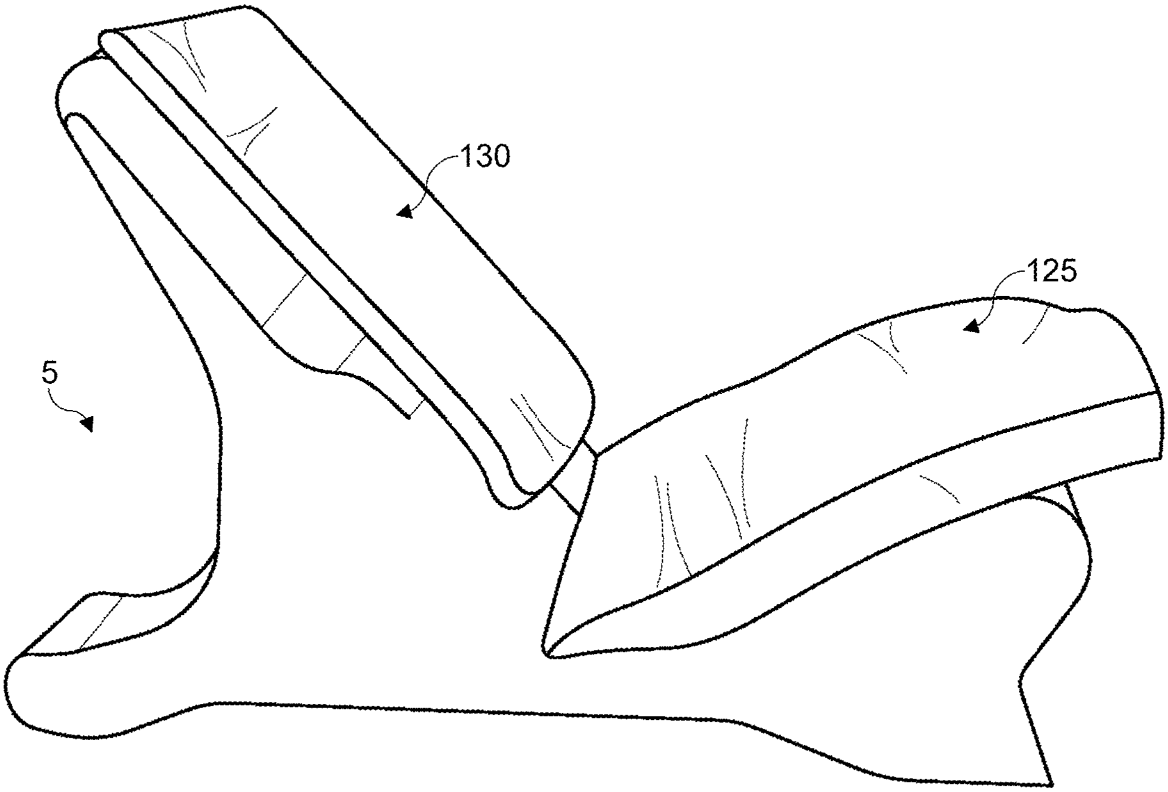
Figure 3A:
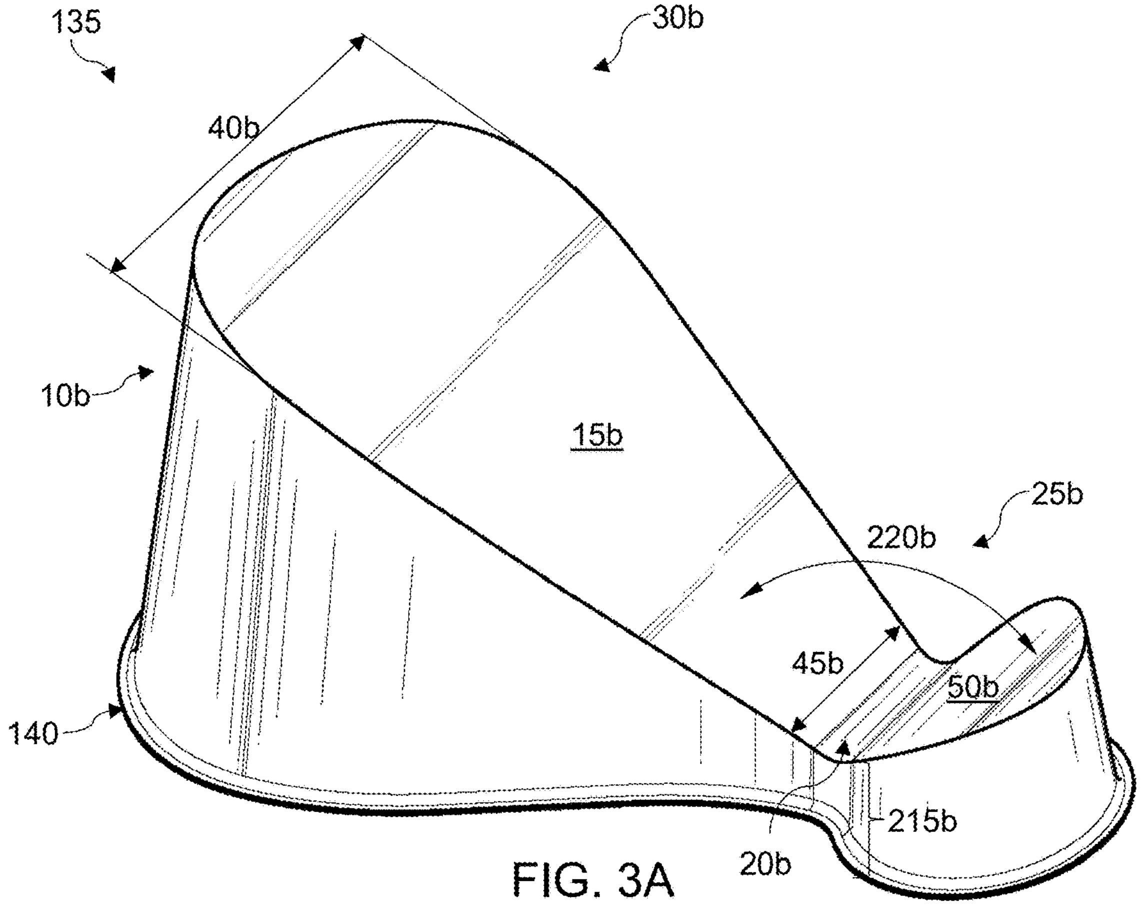
FIGS. 3A-3D display multiple views a second embodiment of a saddle sleeper.
Figure 3B:
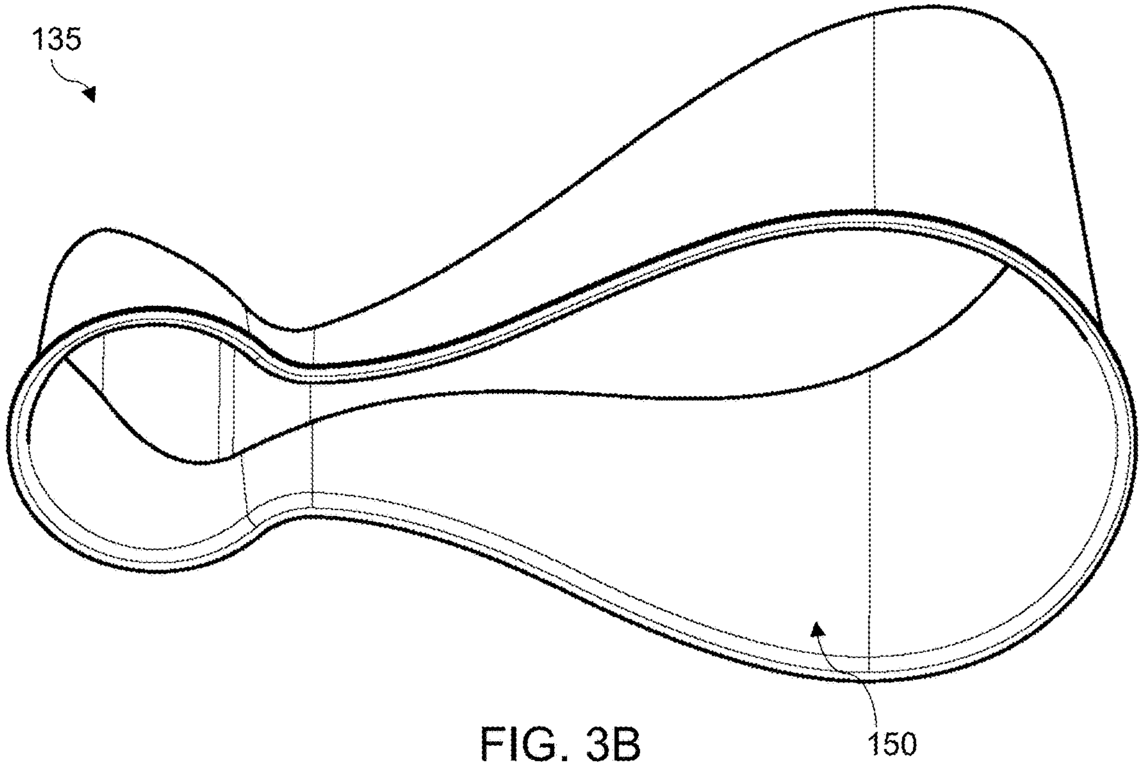
Figure 3C:
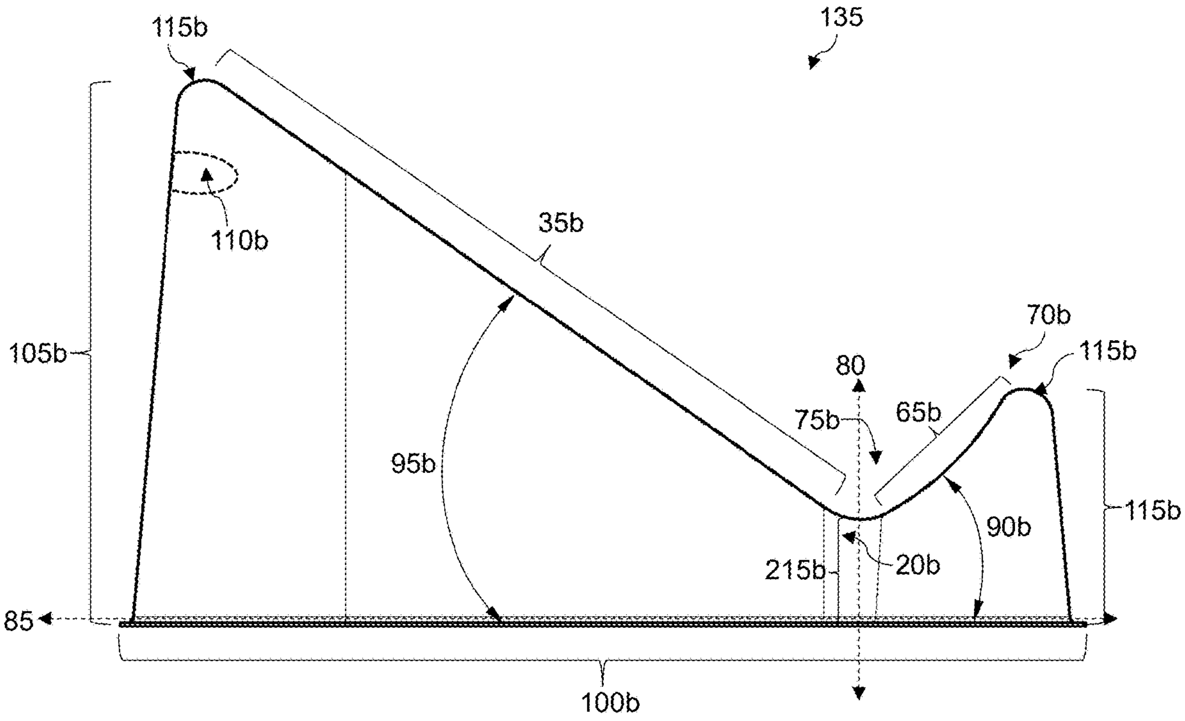
Figure 3D:
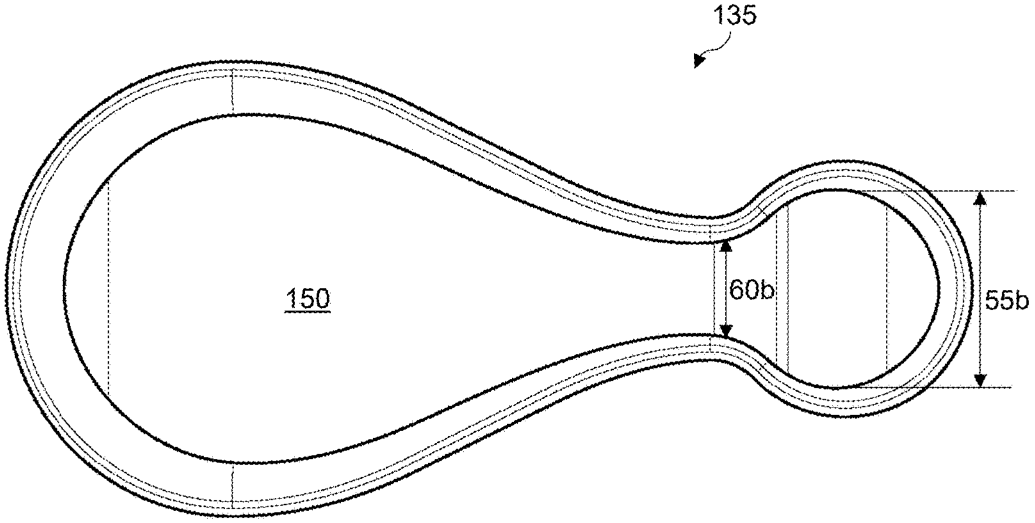
Figure 4A:
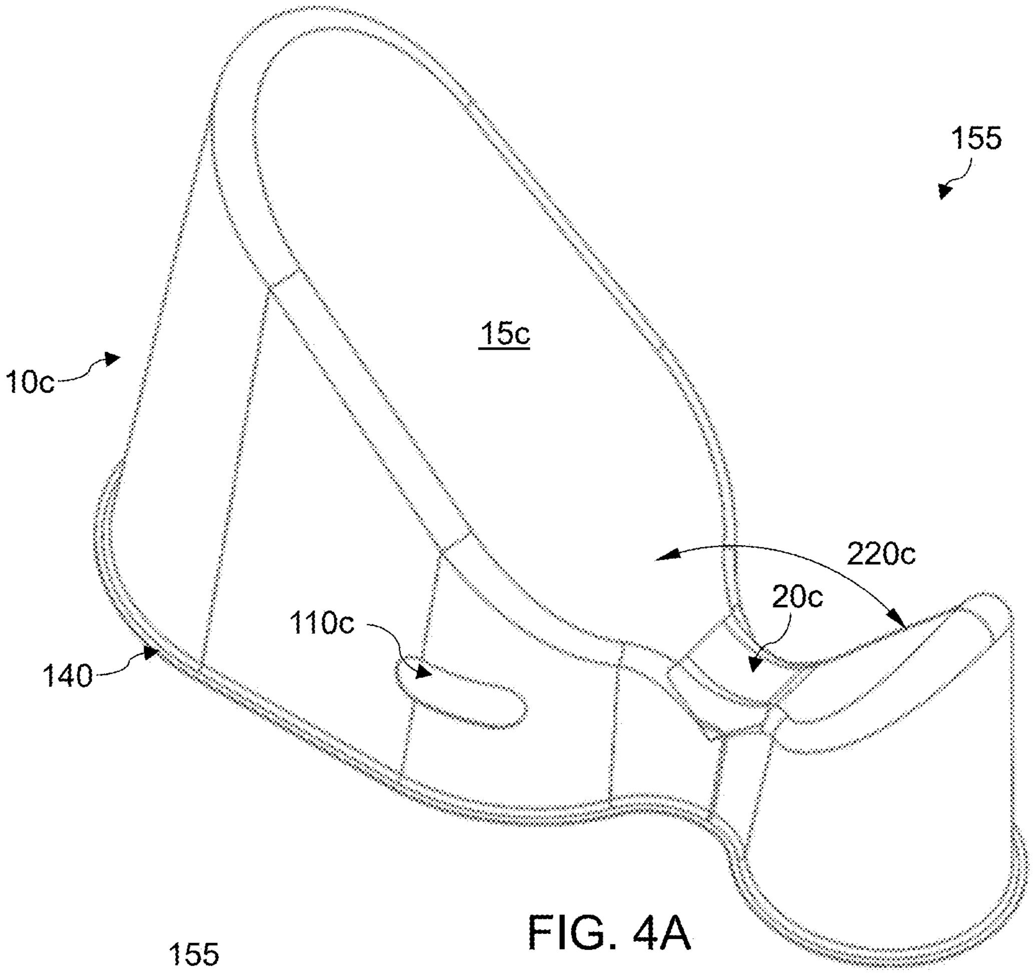
FIGS. 4A-4H display multiple views and a cross-section view of a third embodiment of a saddle sleeper.
Figure 4B:
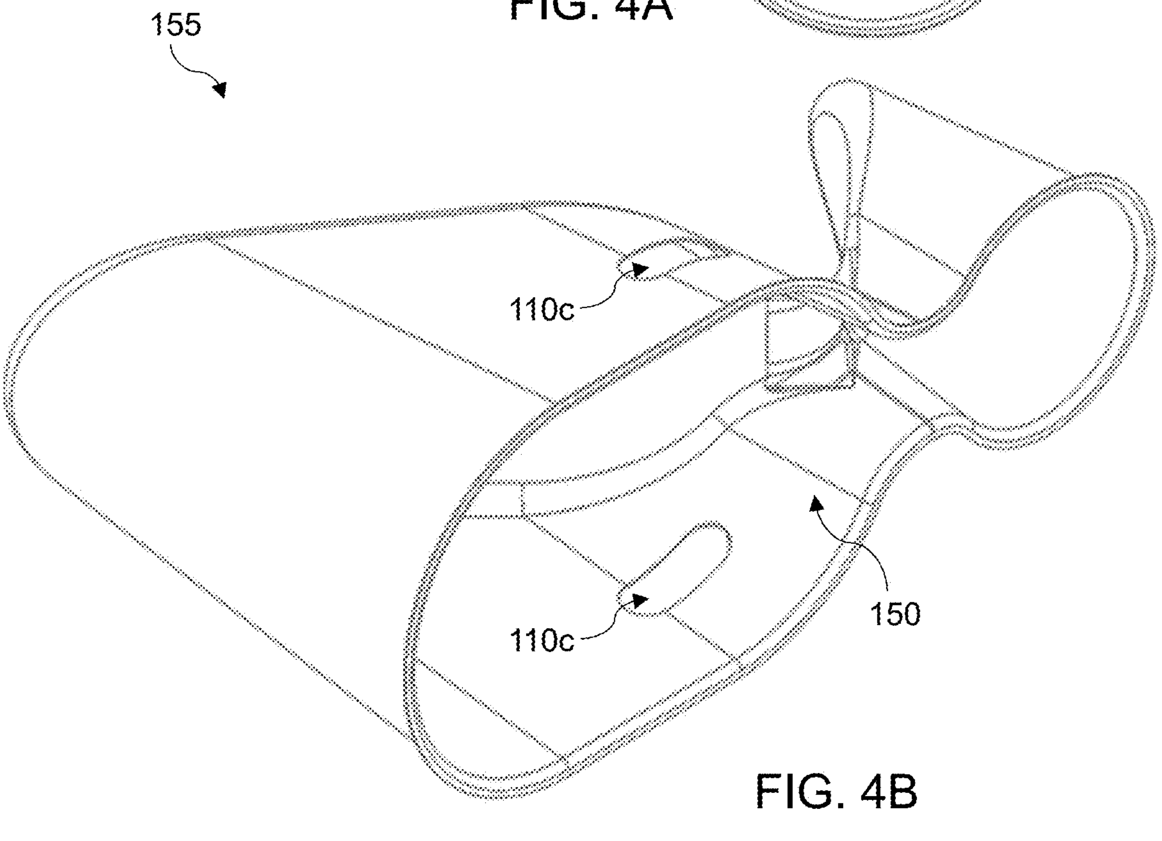
Figure 4C:
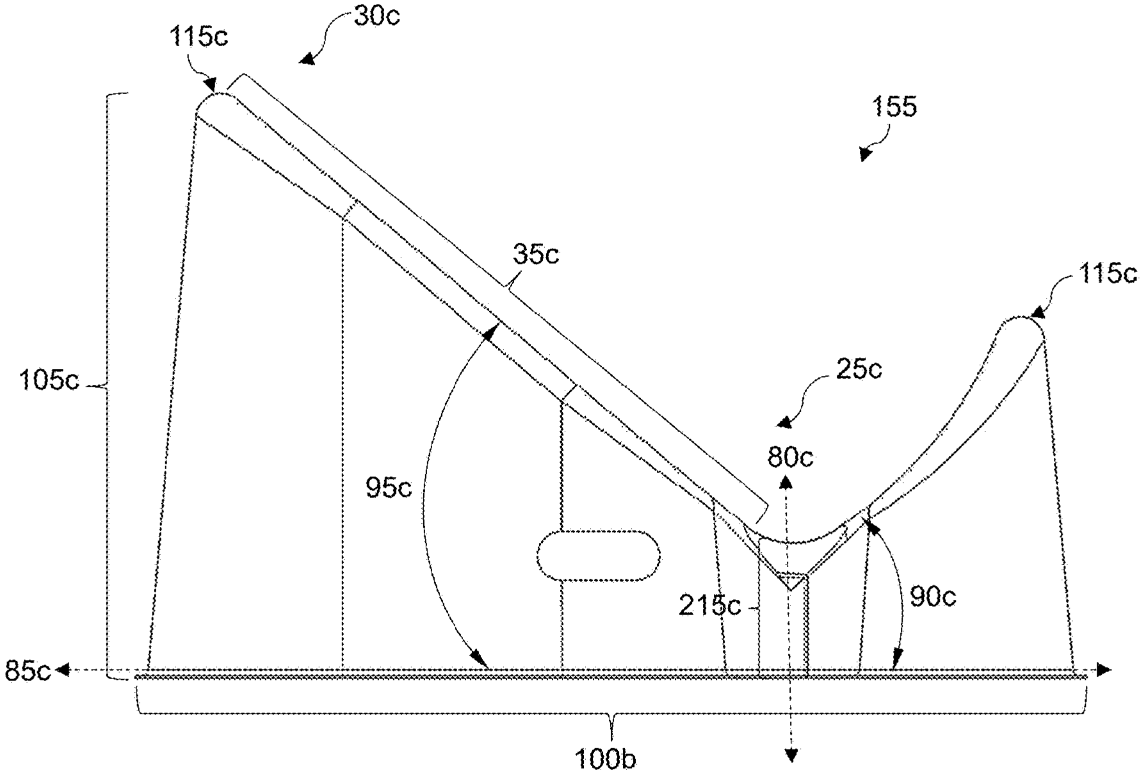
Figure 4D:
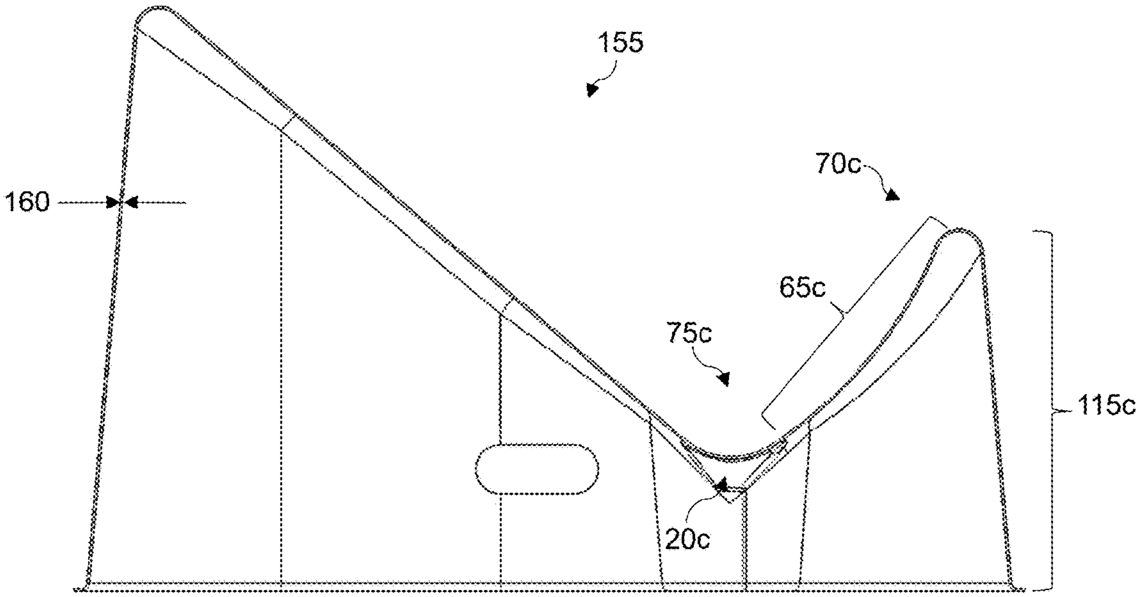
Figure 4E:
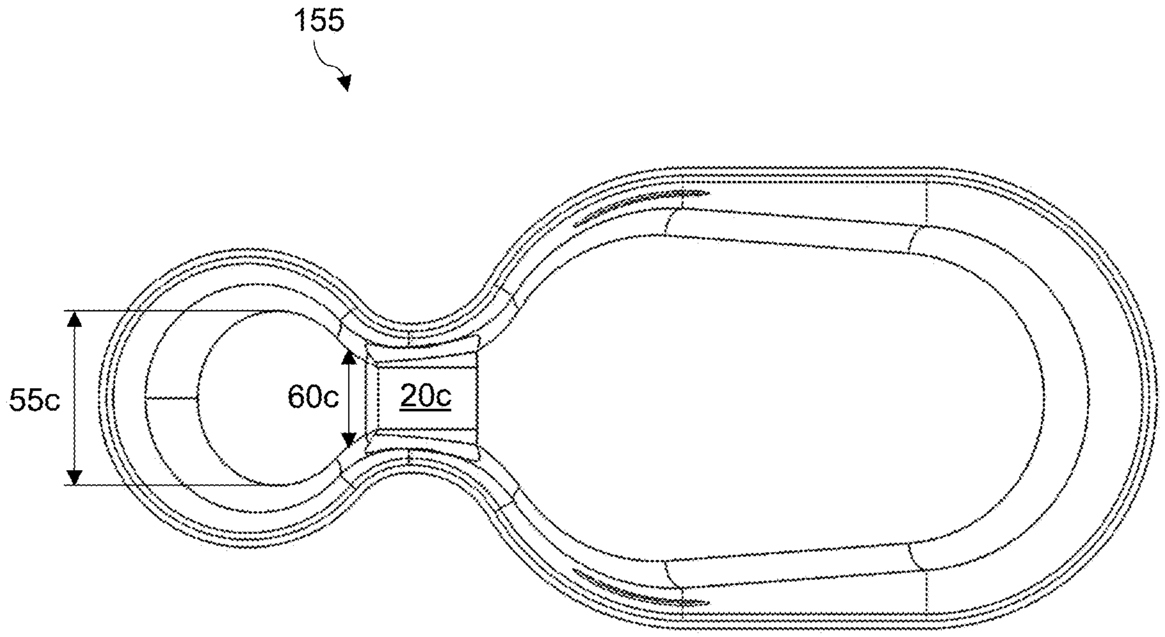
Figure 4F:
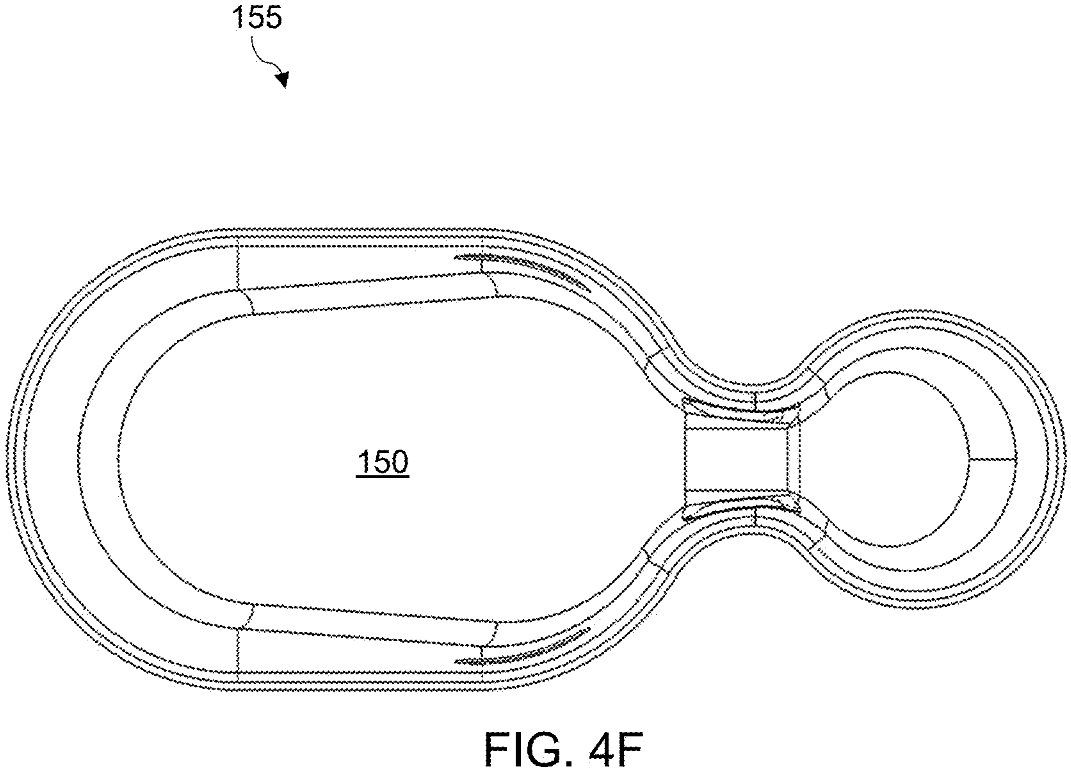
Figure 4G:
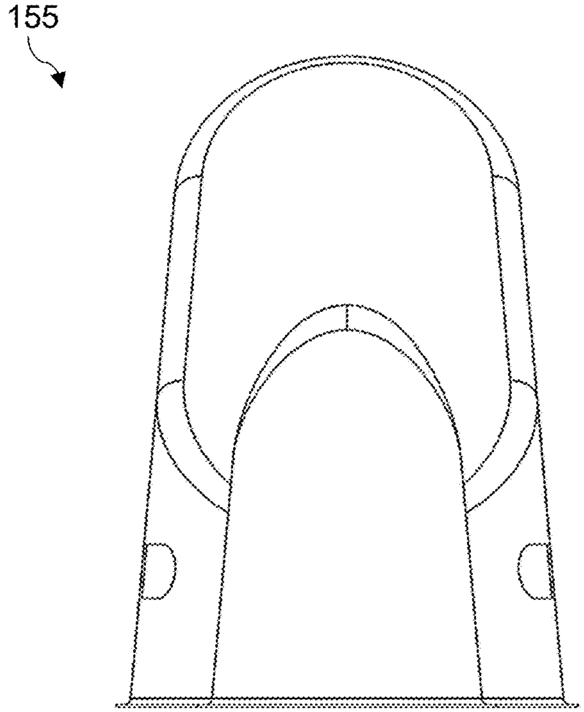
Figure 4H:
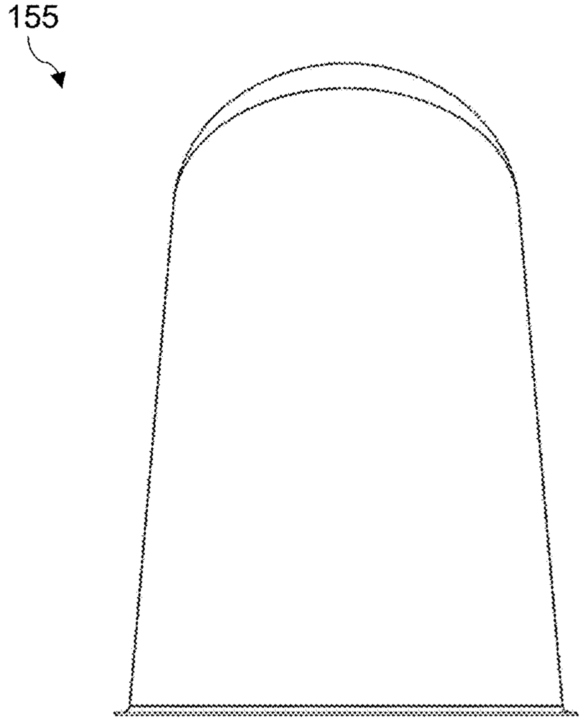
Figure 5A:
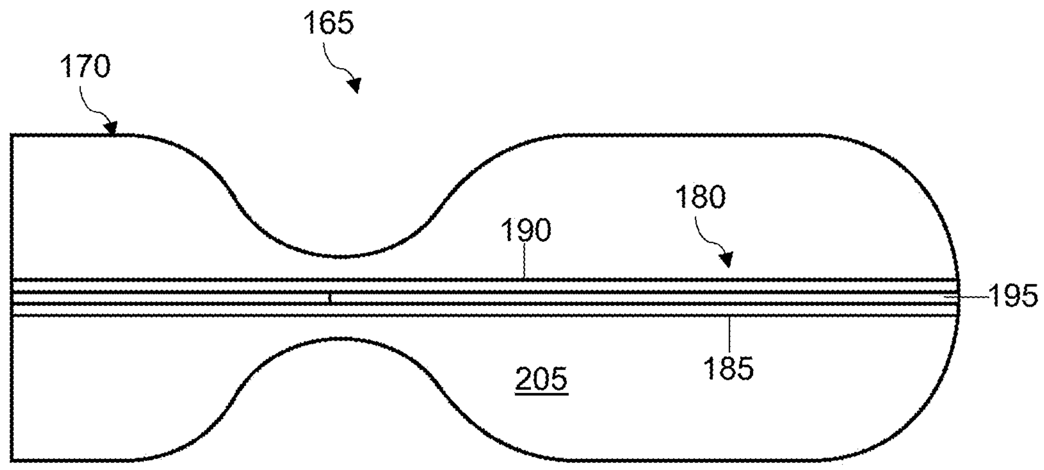
FIGS. 5A-5C display multiple views of a fourth embodiment of a folded saddle sleeper.
Figure 5B:
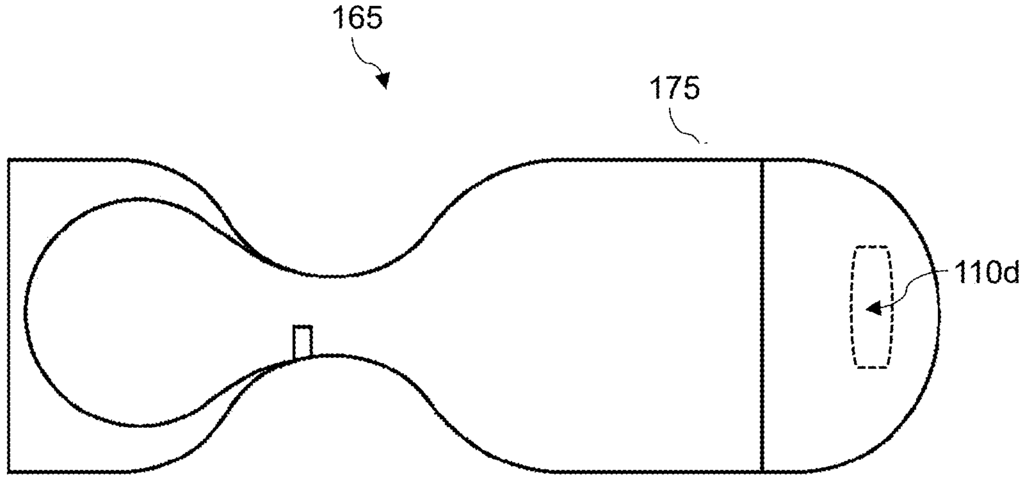
Figure 5C:
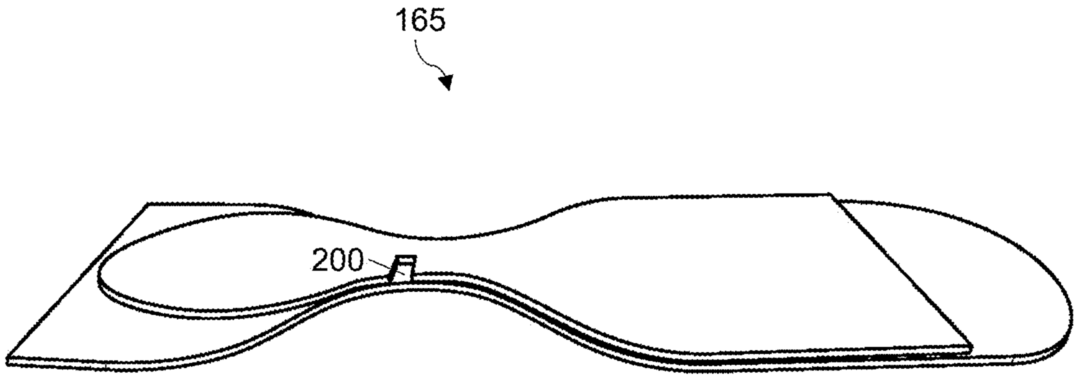
Figure 5D:
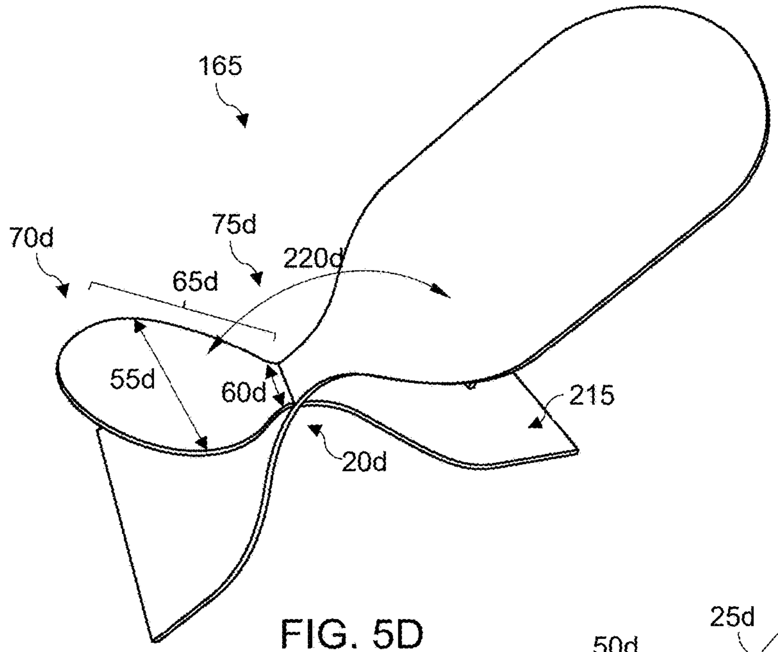
FIGS. 5D-5F display multiple views of the saddle sleeper of FIGS. 5A-5C unfolded.
Figure 5E:
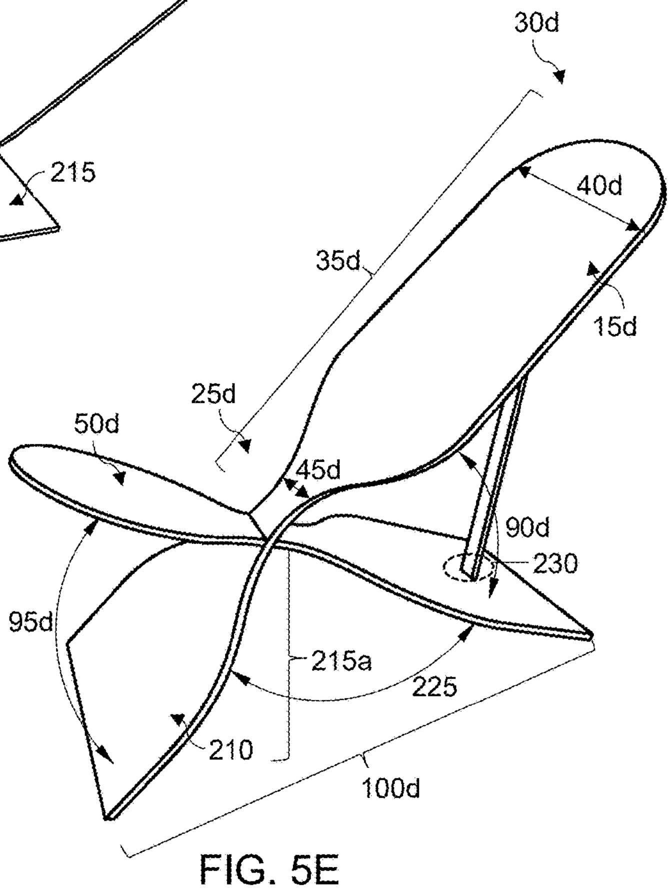
Figure 5F:
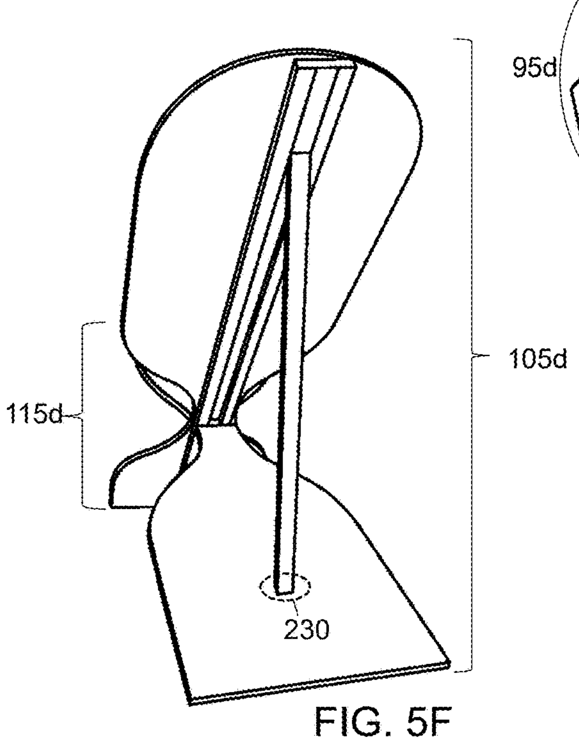

In another embodiment, the first surface or top surface of the first section 430 and/or section 470,480 of the flexible textile 315 is intended or configured to contact, engage or support the anterior facing portions and/or the ventral region of a person's upper torso and head. The upper torso comprises a middle trunk and an upper trunk as shown in FIGS. 2A and 6A-6B. Accordingly, at least a portion of the first surface or top surface of the section 470, 480 and/or the third section 440 is intended or configured to contact, engage or support the posterior facing portions and/or the dorsal region of a person's buttocks of the lower trunk.

A person's ventral region should be facing at least a portion of the first surface or top surface of the flexible textile 315 and straddling the sleeper 300, 365. The person should position and contact their buttocks onto a portion of the third section 440 and/or a portion of the section 470, 480. Subsequently, the person should position the ventral region of their upper torso onto the first surface or top surface of the second section 470, 480 and/or the first section 440. The person's upper legs should straddle the intersection region 20*f*. Alternatively, the person's upper legs or groin area should straddle the second portion 480 of the second section. The second portion width 485 of the second portion 480 is sized and configured to accommodate groin area. The person should be able to sit comfortably without straining the upper legs or inner thighs, and the intersection region height 215*f* should enable the knees of the upper legs to be positioned at 90 degrees or substantially 90 degrees while a portion of the person's feet touch the ground. Alternatively, the intersection region height 215*f* should enable the knees of the upper legs to be positioned at 80 degrees or less while a portion of the person's feet touch the ground. The 80 degrees or less creates an open body angle by lowering the angle of the lower body, keeping the spine in alignment and the person properly positioned to sleep. The benefit of this position is that if one leans inward, the body angle remains 90° or wider.

The flexible textile 315 comprises a material. The material comprises a natural or synthetic textile. The synthetic textiles include polyester, nylon, polypropylene, acrylic, rayon, spandex (Lycra or Elastane), polyethylene, polyurethane, and/or any combination thereof. The natural textiles may include cotton, wool, silk, linen, hemp, and/or any combination thereof.

Figure 16:
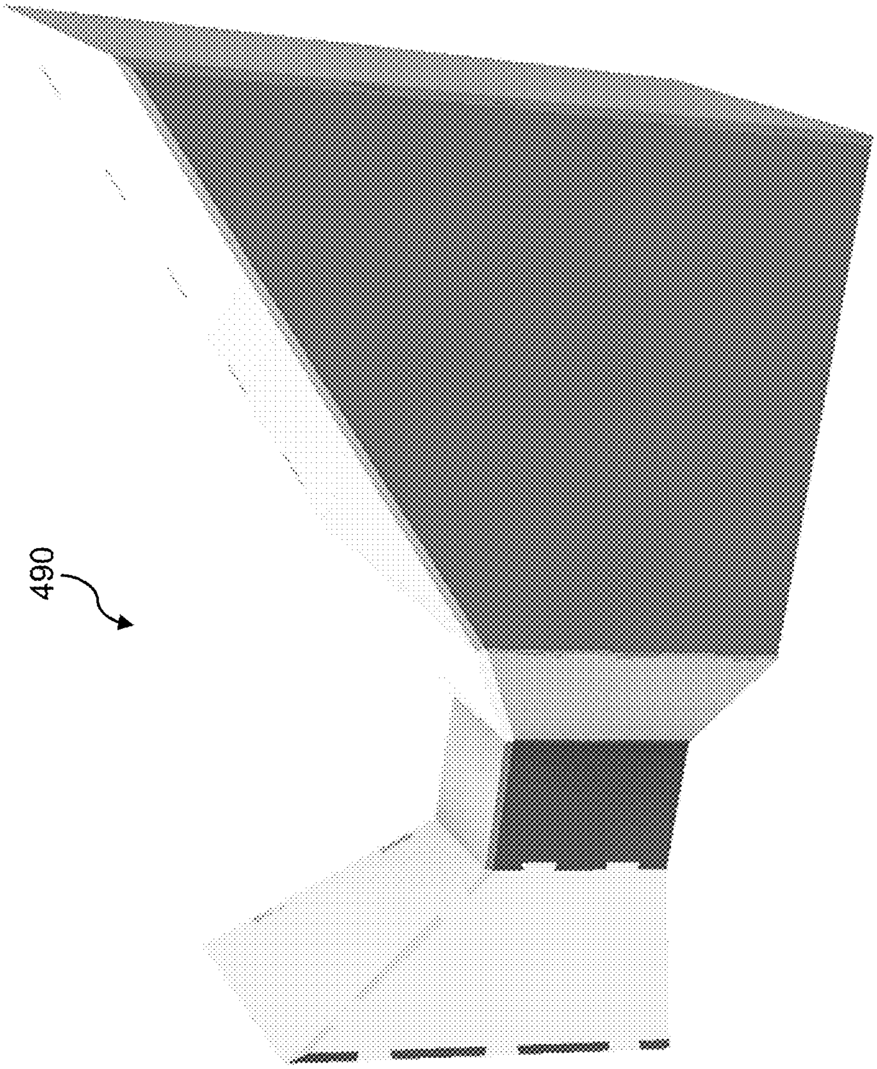
FIG. 16 displays an isometric view of an eighth embodiment of a saddle sleeper.

FIG. 16 illustrates an eighth embodiment of a sleeper 490. The collapsible sleeper 490 comprises a plurality of plates or pieces that are removably connected or removably interlocked together with "dove-tail like" joint and/or a similar joint known in the art. Each of the plurality of plates or pieces are planar or flat. Each of the plurality of pieces are removably connected or removably interlocked to create a three-dimensional sleeper having a first surface at a first orientation angle and a second surface at a second orientation angle. The 3D sleeper further comprises a first side and a second side. Each of the plurality of plates or pieces may be interlocked orthogonally and/or on the same plane as the other pieces.

The foregoing descriptions of specific embodiments of the saddle sleeper have been presented for purposes of illustration and description. They are not intended to be exhaustive or to limit the saddle sleeper to the precise forms disclosed, and obviously many modifications and variations are possible in light of the above teaching. The exemplary embodiment was chosen and described in order to best explain the principles of the saddle sleeper and its practical application, to thereby enable others skilled in the art to best utilize the saddle sleeper and various embodiments with various modifications as are suited to the particular use contemplated.

I claim:

1. A foldable sleeper comprising:

a sleeper frame assembly, the sleeper frame assembly comprising a first frame, the first frame having a first frame upper surface, a first frame lower surface, a first frame first end and a first frame second end, a second frame, the second frame including a second frame first end and a second frame second end, the second frame second end pivotally connected to the first frame at a first location, the second frame being movable relative to the first frame from a first position being parallel to the first frame upper surface to a second position having a first orientation angle relative to the first frame, a third frame, the third frame including a third frame first end and a third frame second end, the third frame second end pivotally connected to the first frame at a second location, the third frame being movable relative to the first frame from a first position being parallel to the first frame lower surface to a second position having a second orientation angle relative the first frame, the first location is different than the second location; and a flexible textile, the flexible textile including a first section, a second section, and a third section, the second section positioned between the first section and the third section, the first section including first section width, the first section being removably coupled to a portion of the first frame first end, the second section including a second section width, the third section including a third section width, the third section being removably coupled to a portion of the second frame first end, the second section width is smaller than the first section width and the third section width.

2. The foldable sleeper of claim 1, wherein the first orientation angle comprises a different angle than the second orientation angle.

3. The foldable sleeper of claim 1, wherein the first orientation angle and the second orientation angle comprise a range of 1 to 90 degrees.

4. The foldable sleeper of claim 1, wherein the first orientation angle and the second orientation angle comprise a range of 30 to 60 degrees.

5. The foldable sleeper of claim 1, wherein the foldable sleeper further comprises a plurality of pads, each of the plurality pads are removably connected to the flexible textile.

6. The foldable sleeper of claim 1, wherein the sleeper frame assembly comprises a material, the material may include plastic or metal.

7. The foldable sleeper of claim 1, wherein the flexible textile may comprise a natural or synthetic material.

8. The foldable sleeper of claim 1, wherein the second section of the flexible textile is suspended between the first section of the flexible textile and the second section of the flexible textile.

9. The foldable sleeper of claim 1, wherein the foldable sleeper further comprises a plurality of floor protectors, the floor protectors being removably coupled to a portion of the first frame or a portion of the third frame.

10. The foldable sleeper of claim 9, wherein the floor protectors comprise a selection of felt pads, anti-skid pads, furniture slides, and/or any combination thereof.

11. The foldable sleeper of claim 1, wherein the foldable sleeper further comprises a base member, the base member may be removably coupled to a portion of the first frame second end and to a portion of the third frame member first end.

12. The foldable sleeper of claim 1, wherein the first location is adjacent to the first frame second end and the second location is adjacent to the first frame first end.

13. The foldable sleeper of claim 1, wherein the first section being removably coupled to a portion of the first frame member first end comprises the first section having a first section pocket cavity being sized and configured to receive the portion of the first frame member first end, and the third section being removably coupled to a portion of the second frame member first end comprises the third section having a third section pocket cavity being sized and configured to receive the portion of the second frame member first end.

14. The foldable sleeper of claim 1, wherein the second section width comprises a first portion width and a second portion width, the first portion width is greater than the second portion width.

15. The foldable sleeper of claim 1, wherein the second section comprises a taper shape.

16. The foldable sleeper of claim 1, wherein the second section having a first portion perimeter and a second portion perimeter, the first portion perimeter is spaced apart from each frame member of the first frame to create a first opening and the second portion perimeter is spaced apart from each frame member of the first frame to create a second opening, the first opening is smaller than the second opening.

17. The foldable sleeper of claim 16, wherein the second opening is sized and configured to receive a portion of a lower extremities of a person and the first opening is sized and configured to receive a portion of an upper extremities of a person.

18. The foldable sleeper of claim 1, wherein at least a portion of the second section is sized and configured to support at least a portion of a ventral side of an upper torso of a person.

19. The foldable sleeper of claim 1, wherein the foldable sleeper further comprises a plurality of angle restrictor hinges.

* * * * *